US009952735B2

United States Patent
Kurasawa et al.

(10) Patent No.: US 9,952,735 B2
(45) Date of Patent: *Apr. 24, 2018

(54) SENSOR-EQUIPPED DISPLAY DEVICE

(71) Applicant: Japan Display Inc., Tokyo (JP)

(72) Inventors: Hayato Kurasawa, Tokyo (JP); Koji Ishizaki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,576

(22) Filed: Sep. 28, 2017

(65) Prior Publication Data

US 2018/0018049 A1    Jan. 18, 2018

(30) Foreign Application Priority Data

Jun. 10, 2014   (JP) ................................. 2014-119628

(51) Int. Cl.
*G06F 3/044*   (2006.01)
*G06F 3/041*   (2006.01)

(52) U.S. Cl.
CPC ............ *G06F 3/044* (2013.01); *G06F 3/0412* (2013.01); *G06F 3/0416* (2013.01); *G06F 2203/04101* (2013.01); *G06F 2203/04112* (2013.01)

(58) Field of Classification Search
CPC ..................... H05K 9/00; H05K 9/0096; G06F 2203/04112; G06F 3/0412; G06F 3/044; G09G 3/3648; G02F 1/13338; G02F 1/13436
See application file for complete search history.

(56) References Cited

U.S. PATENT DOCUMENTS

| 8,736,571 B1* | 5/2014 | Guard ................. G02F 1/13338 345/173 |
| 2008/0062140 A1 | 3/2008 | Hotelling |
| 2012/0242606 A1 | 9/2012 | Mackey |

(Continued)

FOREIGN PATENT DOCUMENTS

| CN | 103246387 | 8/2013 |
| CN | 103329642 | 9/2013 |

(Continued)

OTHER PUBLICATIONS

Korean Office Action (with English translation) dated Jun. 21, 2016 in corresponding Korean Application No. 10-2015-0080496 (7 pages).

(Continued)

*Primary Examiner* — Benjamin C Lee
*Assistant Examiner* — Robert Michaud
(74) *Attorney, Agent, or Firm* — K&L Gates LLP

(57) ABSTRACT

A sensor-equipped display device is provided and includes a display panel and a detection electrode. The panel includes a display area in which unit pixels are arranged in a matrix, each of unit pixels including subpixels. The electrode includes conductive line fragments arranged on a detection surface, and is configured to detect a contact of an object to the surface. The detection electrode has an electrode pattern formed of the line fragments on a grid defined by first and second lines. Extending directions of the first and second lines are tilted based on a first and second unit length of the unit pixel in the first and second direction.

8 Claims, 23 Drawing Sheets

(56) References Cited

U.S. PATENT DOCUMENTS

| | | |
|---|---|---|
| 2013/0222297 A1 | 8/2013 | Adachi |
| 2013/0294037 A1 | 11/2013 | Kuriki et al. |
| 2014/0062901 A1 | 3/2014 | Han et al. |
| 2014/0292710 A1 | 10/2014 | Koito et al. |
| 2014/0292713 A1 | 10/2014 | Koito et al. |
| 2014/0293158 A1 | 10/2014 | Kurasawa et al. |
| 2014/0320760 A1 | 10/2014 | Ishizaki et al. |

FOREIGN PATENT DOCUMENTS

| | | |
|---|---|---|
| JP | 2006-344163 | 12/2006 |
| JP | 2011-137882 | 12/2009 |
| JP | 2010-039537 | 2/2010 |
| JP | 2012-163951 | 8/2012 |
| JP | 2012-164648 | 8/2012 |
| JP | 2013-225195 | 10/2013 |
| JP | 2014-191650 | 10/2014 |
| JP | 2014-191657 | 10/2014 |
| JP | 2014-191660 | 10/2014 |
| JP | 2014-191661 | 10/2014 |
| KR | 10-2014-0028468 | 3/2014 |
| TW | 201218056 | 5/2012 |
| TW | 201349053 | 12/2013 |
| WO | WO/2014/021225 | 2/2014 |

OTHER PUBLICATIONS

Taiwanese Office Action (with English abstract) dated Sep. 8, 2016 in corresponding Taiwanese application No. 104115935 (18 pages).
Chinese Office Action dated Sep. 18, 2017 in corresponding Chinese Application No. 201510314179.2.
Japanese Office Action dated Feb. 6, 2018 in corresponding Japanese Application No. 2014-119628.

\* cited by examiner

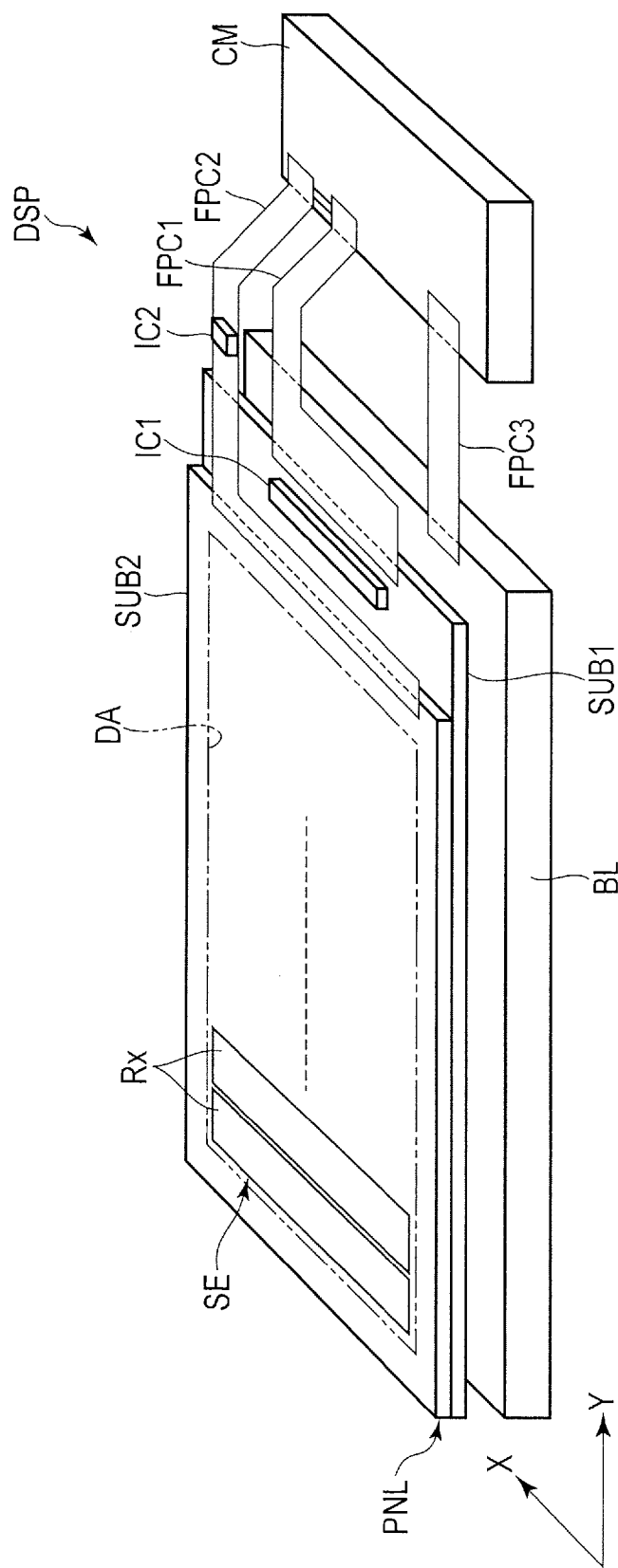
F I G. 1

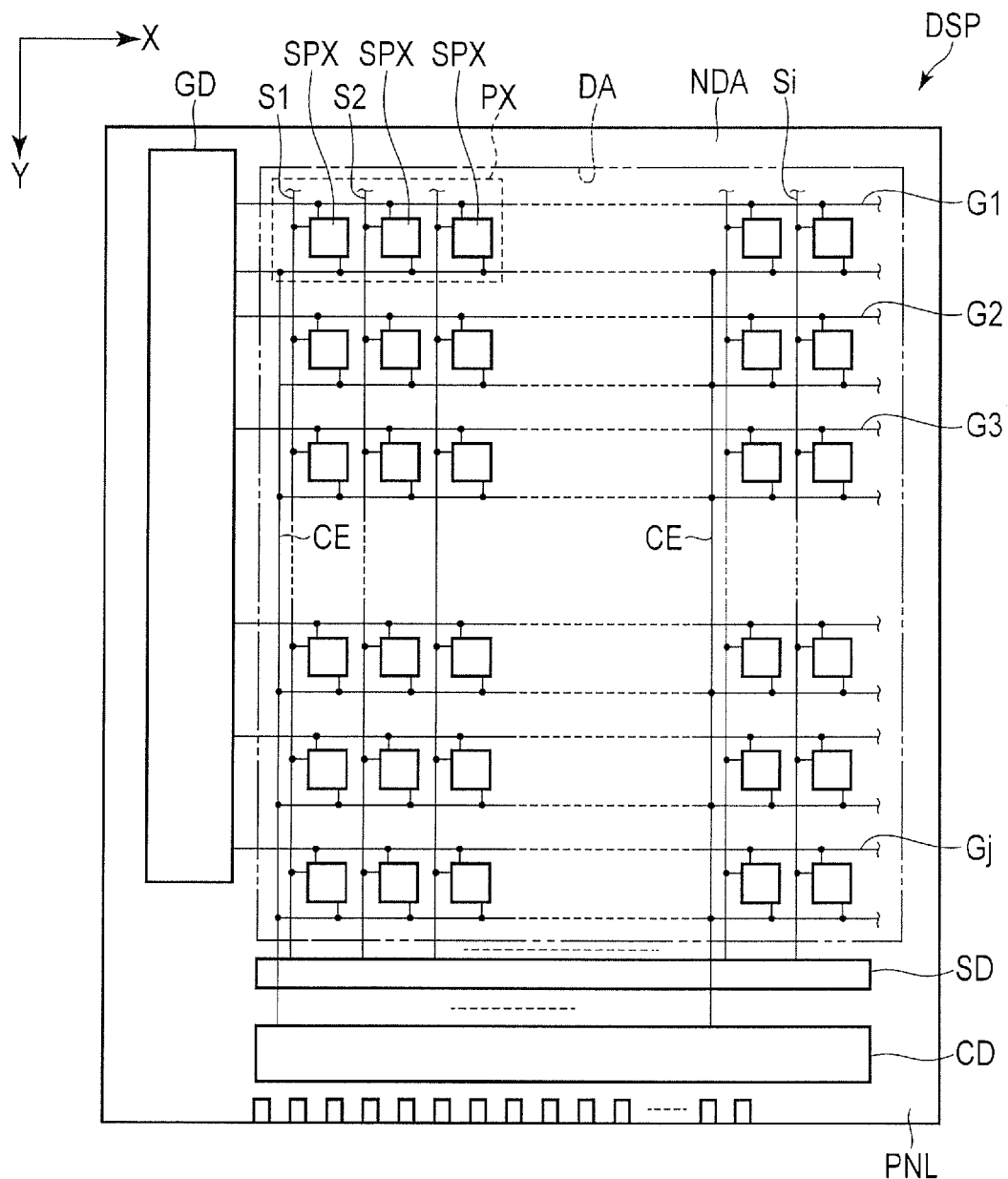
F I G. 2

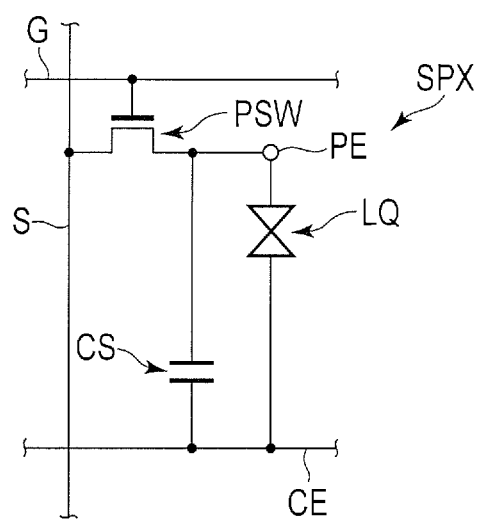
F I G. 3

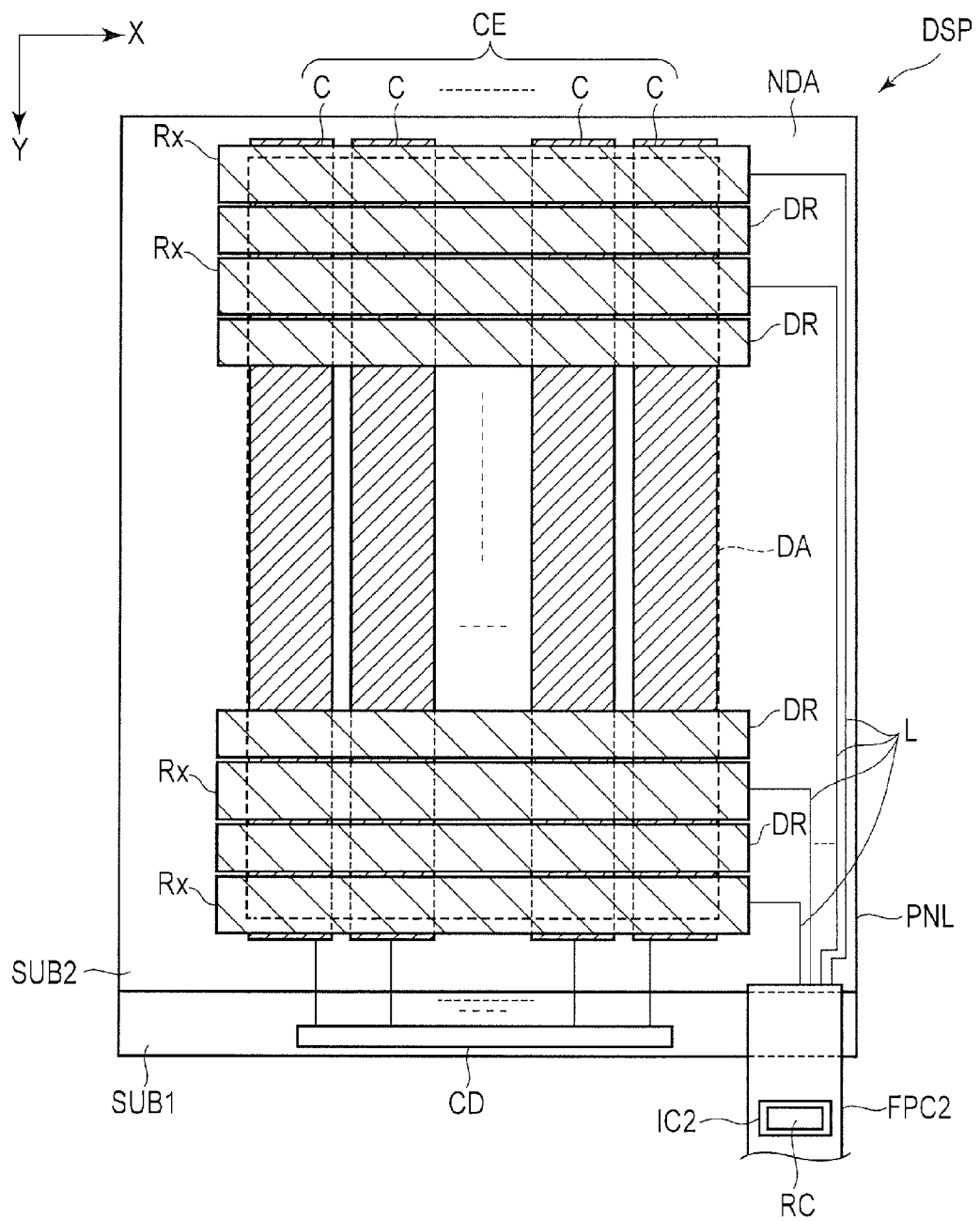
F I G. 5

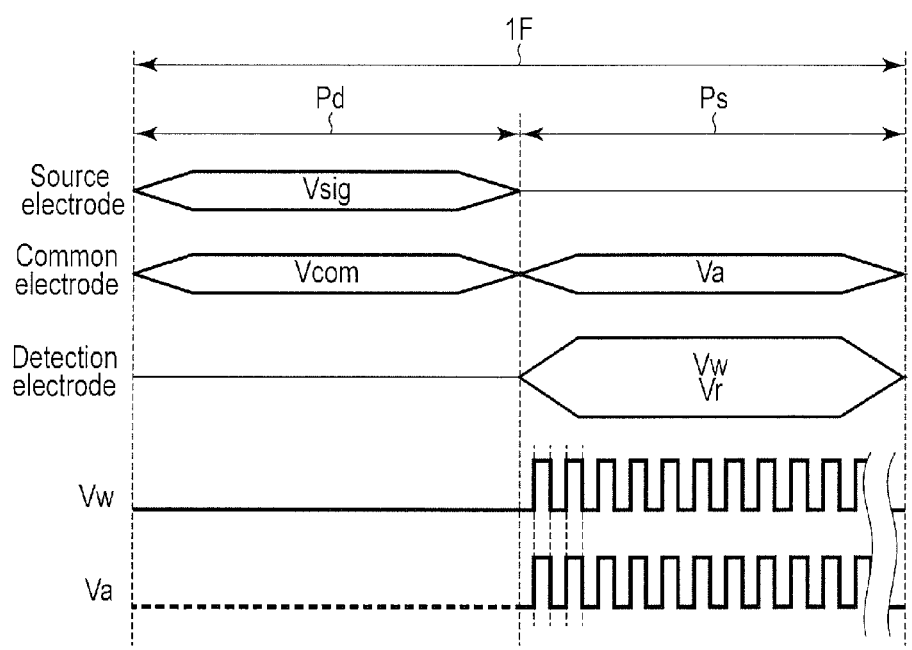
F I G. 9

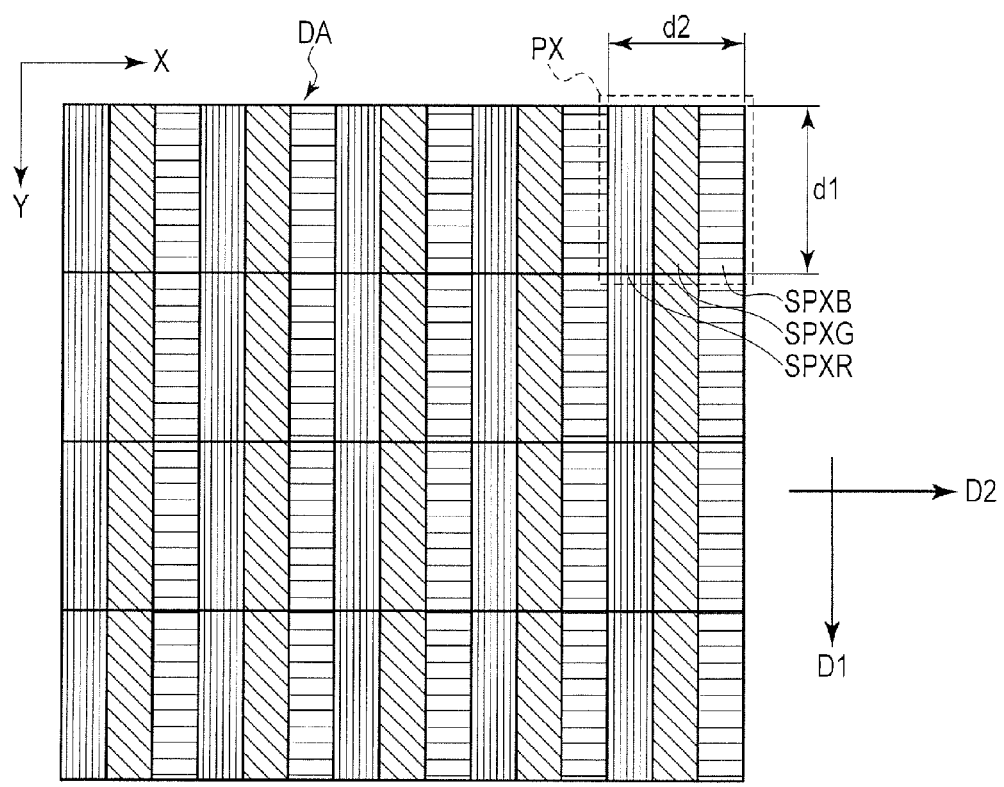
F I G. 12

|  |  |  | Type (A) d2=90μm d1=90μm | | Type (B) d2=120μm d1=90μm | |
|---|---|---|---|---|---|---|
| Evaluation examples | M | N | Angle θ | Evaluation results | Angle θ | Evaluation results |
| E101 | 1 | 0 | 0.00 | Level6 | 0.00 | Level6 |
| E102 | 5 | 1 | 11.31 | Level4 | 14.93 | Level4 |
| E103 | 4 | 1 | 14.04 | Level4 | 18.43 | Level4 |
| E104 | 3 | 1 | 18.43 | Level4 | 23.96 | Level4 |
| E105 | 2 | 1 | 26.57 | Level4 | 33.69 | Level4 |
| E106 | 5 | 3 | 30.96 | Level2 | 38.66 | Level2 |
| E107 | 3 | 2 | 33.69 | Level3 | 41.63 | Level3 |
| E108 | 4 | 3 | 36.87 | Level1 | 45.00 | Level1 |
| E109 | 5 | 4 | 38.66 | Level1 | 46.85 | Level1 |
| E110 | 6 | 5 | 39.81 | Level1 | 48.01 | Level1 |
| E111 | 1 | 1 | 45.00 | Level5 | 53.13 | Level5 |
| E112 | 5 | 6 | 50.19 | Level1 | 57.99 | Level1 |
| E113 | 4 | 5 | 51.34 | Level1 | 59.04 | Level1 |
| E114 | 3 | 4 | 53.13 | Level1 | 60.64 | Level1 |
| E115 | 2 | 3 | 56.31 | Level3 | 63.43 | Level3 |
| E116 | 3 | 5 | 59.04 | Level2 | 65.77 | Level2 |
| E117 | 1 | 2 | 63.43 | Level4 | 69.44 | Level4 |
| E118 | 1 | 3 | 71.57 | Level4 | 75.96 | Level4 |
| E119 | 1 | 4 | 75.96 | Level4 | 79.38 | Level4 |
| E120 | 1 | 5 | 78.69 | Level4 | 81.47 | Level4 |
| E121 | 0 | 1 | 90.00 | Level6 | 90.00 | Level6 |

FIG. 13

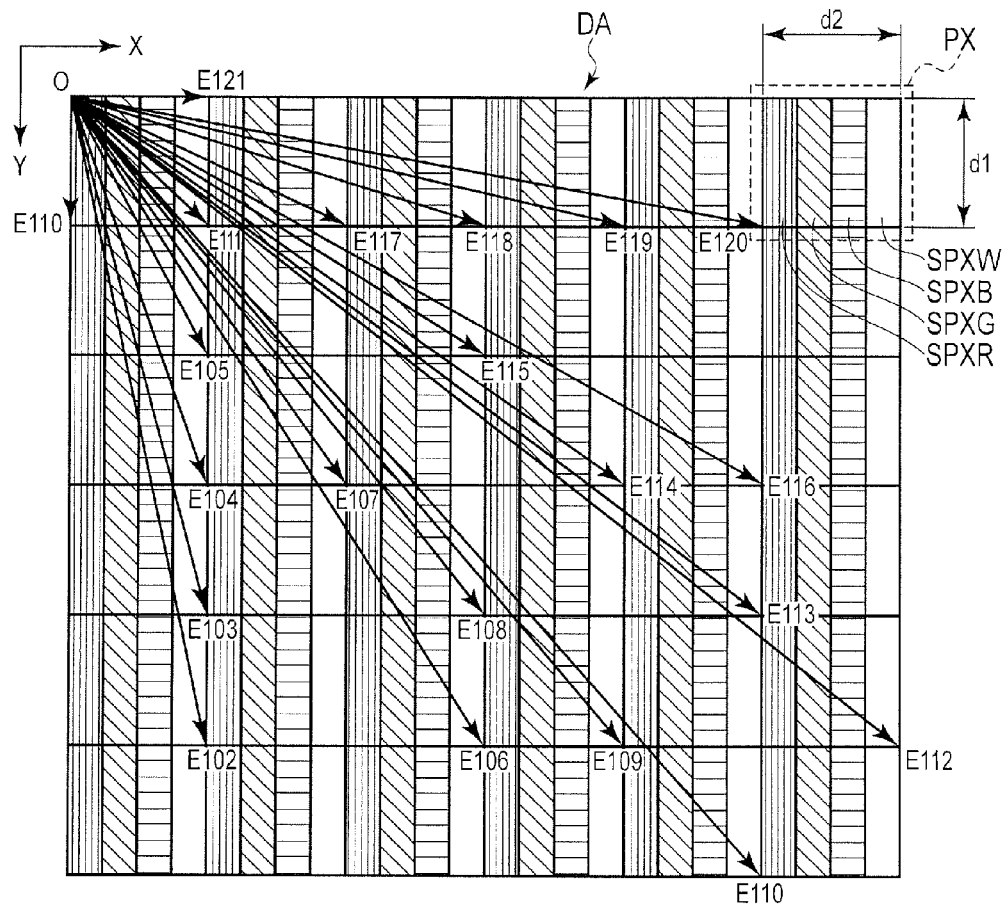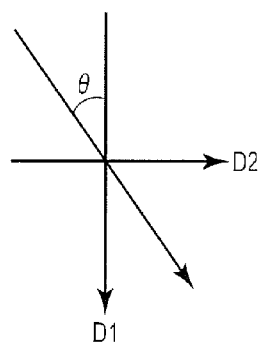
F I G. 14

|  | Type (A) d2=90μm, d1=90μm | | Type (B) d2=120μm, d1=90μm | |
| --- | --- | --- | --- | --- |
| Evaluation examples | m | n | Angle φ | Evaluation results | Angle φ | Evaluation results |

| Evaluation examples | m | n | Angle φ | Evaluation results | Angle φ | Evaluation results |
| --- | --- | --- | --- | --- | --- | --- |
| E201 | 1 | 0 | 0.00 | Level6 | 0.00 | Level6 |
| E202 | 5 | 1 | 11.31 | Level4 | 14.93 | Level4 |
| E203 | 4 | 1 | 14.04 | Level4 | 18.43 | Level4 |
| E204 | 3 | 1 | 18.43 | Level4 | 23.96 | Level4 |
| E205 | 2 | 1 | 26.57 | Level4 | 33.69 | Level4 |
| E206 | 5 | 3 | 30.96 | Level2 | 38.66 | Level2 |
| E207 | 3 | 2 | 33.69 | Level1 | 41.63 | Level1 |
| E208 | 4 | 3 | 36.87 | Level1 | 45.00 | Level1 |
| E209 | 5 | 4 | 38.66 | Level1 | 46.85 | Level1 |
| E210 | 6 | 5 | 39.81 | Level1 | 48.01 | Level1 |
| E211 | 1 | 1 | 45.00 | Level5 | 53.13 | Level5 |
| E212 | 5 | 6 | 50.19 | Level1 | 57.99 | Level1 |
| E213 | 4 | 5 | 51.34 | Level1 | 59.04 | Level1 |
| E214 | 3 | 4 | 53.13 | Level1 | 60.64 | Level1 |
| E215 | 2 | 3 | 56.31 | Level1 | 63.43 | Level1 |
| E216 | 3 | 5 | 59.04 | Level2 | 65.77 | Level2 |
| E217 | 1 | 2 | 63.43 | Level4 | 69.44 | Level4 |
| E218 | 1 | 3 | 71.57 | Level4 | 75.96 | Level4 |
| E219 | 1 | 4 | 75.96 | Level4 | 79.38 | Level4 |
| E220 | 1 | 5 | 78.69 | Level4 | 81.47 | Level4 |
| E221 | 0 | 1 | 90.00 | Level6 | 90.00 | Level6 |

FIG. 15

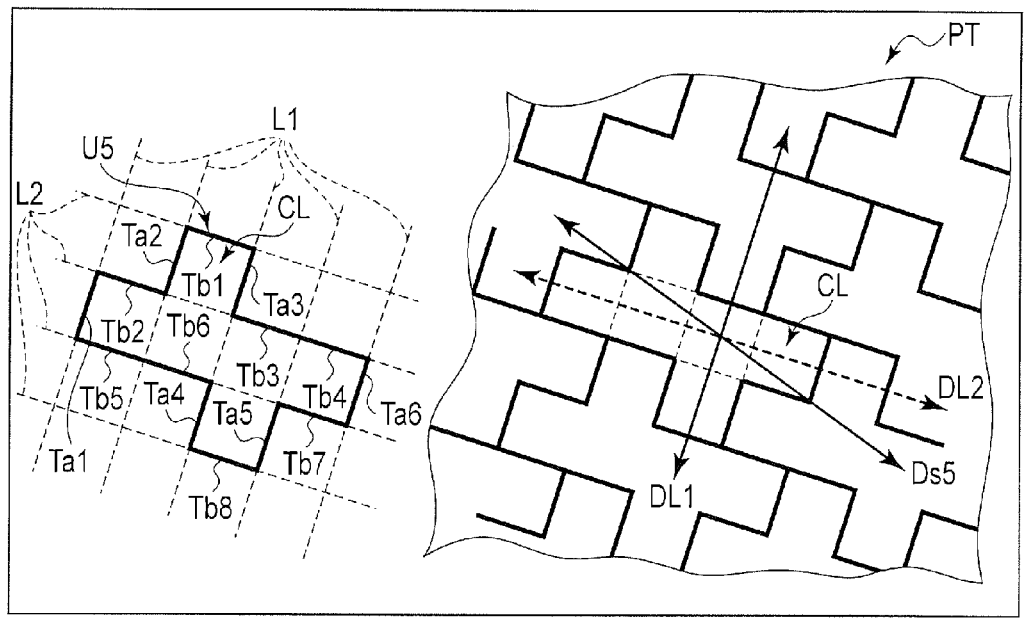
F I G. 20
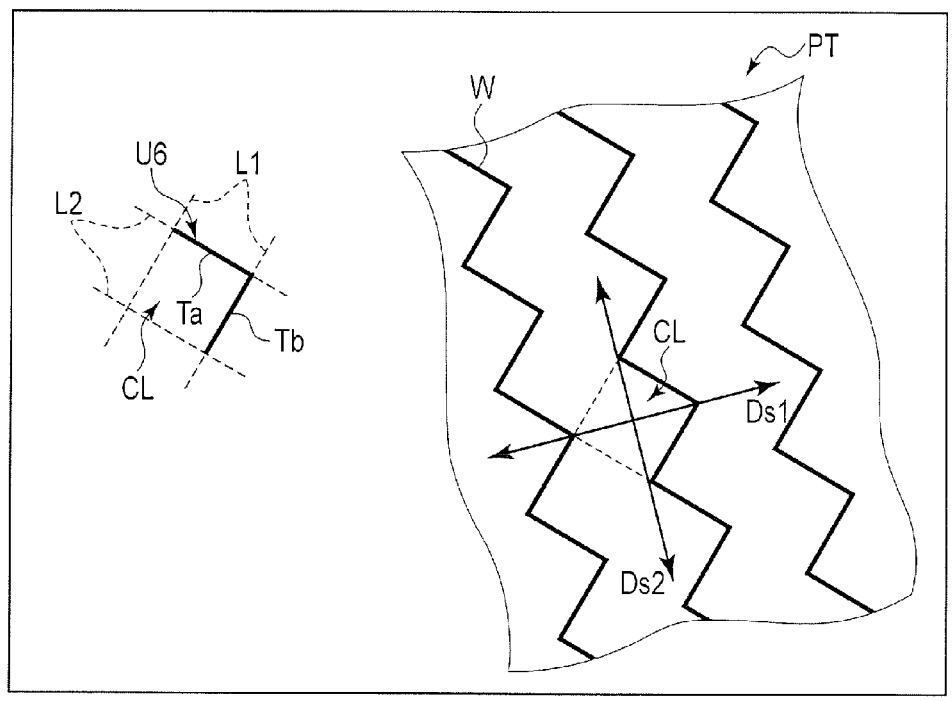
F I G. 21

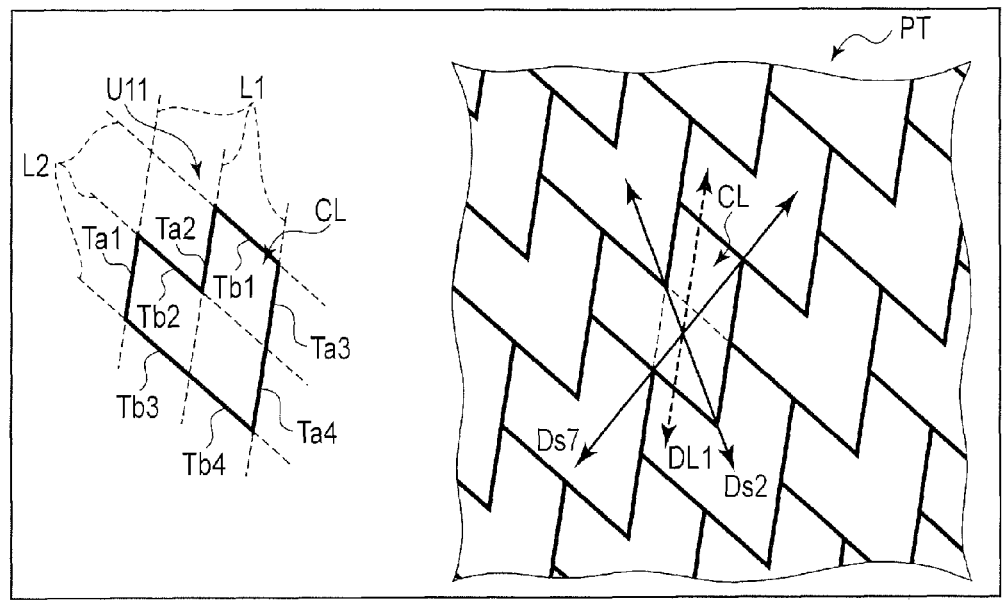
F I G. 26
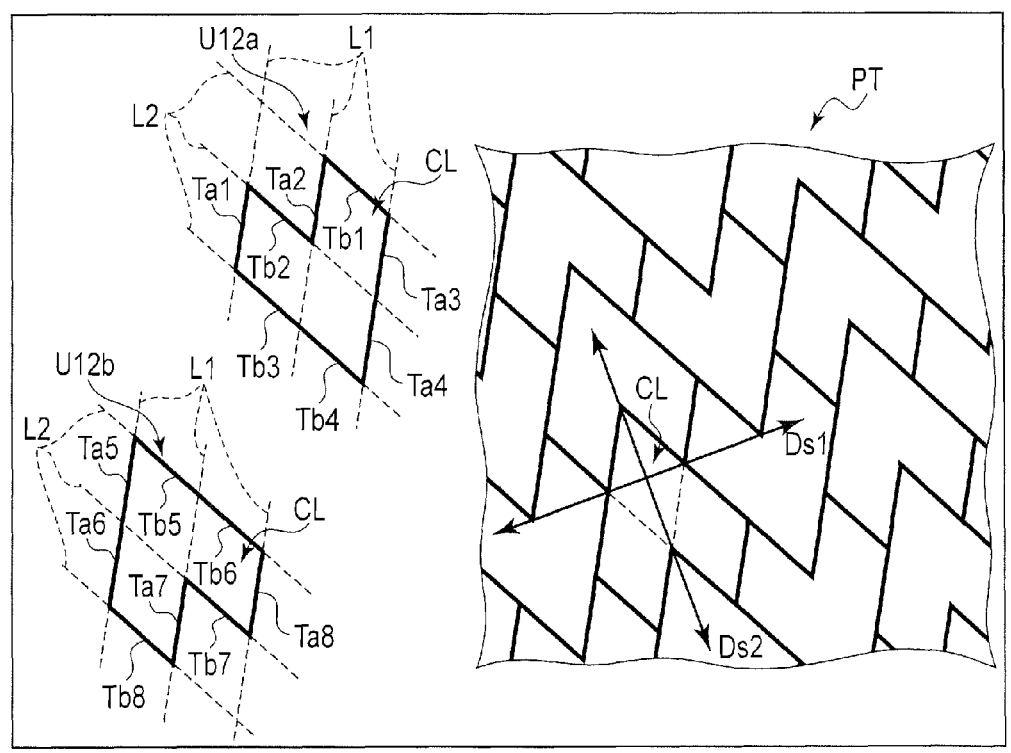
F I G. 27

SENSOR-EQUIPPED DISPLAY DEVICE

CROSS REFERENCES TO RELATED APPLICATIONS

The present application is a continuation application of U.S. patent application Ser. No. 14/734,465, filed on Jun. 9, 2015, which application claims priority to Japanese Priority Patent Application JP 2014-119628 filed in the Japan Patent Office on Jun. 10, 2014, the entire content of which is hereby incorporated by reference.

FIELD

Embodiments described herein relate generally to a sensor-equipped display device.

BACKGROUND

Display devices including sensors which detect a contact or approach of an object are used commercially (they are often referred to as touchpanels). As an example of such sensors, there is a capacitive sensor which detects a contact or the like of an object based on a change in the capacitance between a detection electrode and a driving electrode facing each other with a dielectric interposed therebetween.

The detection electrodes and the driving electrodes are disposed to overlap with a display area to detect a contact or the like of an object therein. However, the detection electrodes and the driving electrodes disposed in such a manner and the pixels contained in the display area may generate interference which will generate a moiré.

Sensor-equipped display devices which can prevent or reduce a moiré are required.

SUMMARY

This application relates generally to a display device including a sensor-equipped display device.

In an embodiment, a sensor-equipped display device is provided. The sensor-equipped display device includes a display panel including a display area in which unit pixels are arranged in a matrix, each of unit pixels including a plurality of subpixels corresponding to different colors; and a detection electrode including conductive line fragments arranged on a detection surface which is parallel to the display area, the detection electrode configured to detect a contact or approach of an object to the detection surface, wherein the detection electrode includes an electrode pattern formed of the line fragments on a grid defined by first lines extending parallel to each other within the detection surface and second lines extending parallel to each other within the detection surface, the first lines and the second lines crossing each other to form intersections, and the line fragments selectively arranged between intersections adjacent to each other in the grid, an extending direction of the first lines, an extending direction of the second lines, and a diagonal line direction of the grid are tilted with respect to a first direction by an angle corresponding to arc tangent of a ratio between a value obtained by multiplying a first unit length of the unit pixel in the first direction by a first integer which is two or more and a value obtained by multiplying second unit length of the unit pixel in a second direction which is orthogonal to the first direction by a second integer which is two or more and different from the first integer, and the first direction is a direction in which, amongst the plurality of subpixels, subpixels having maximum luminosity for humans are aligned on the display area.

Additional features and advantages are described herein, and will be apparent from the following Detailed Description and the figures.

BRIEF DESCRIPTION OF THE FIGURES

FIG. 1 is a perspective view which schematically shows the structure of a sensor-equipped display device of an embodiment.

FIG. 2 is a view which schematically shows the basic structure and equivalent circuit of the display device.

FIG. 3 is a view which schematically shows an equivalent circuit of a subpixel of the display device.

FIG. 5 is a plan view which schematically shows the structure of a sensor of the display device.

FIG. 9 is a view which illustrates a specific example of how to drive the sensor in the self-capacitive sensing method.

FIG. 12 is a view which shows an example of a display area of the display device.

FIG. 13 shows evaluation results of moiré between electrode patterns having linear metal lines and the display area.

FIG. 14 is a view which shows the display area of the display device and extending direction of the metal line in each evaluation example shown in FIG. 13.

FIG. 15 shows evaluation results of moiré between electrode patterns having linear metal lines and the display area.

FIG. 20 is a view which schematically shows part of electrode pattern of example 5.

FIG. 21 is a view which schematically shows part of electrode pattern of example 6.

FIG. 26 is a view which schematically shows part of electrode pattern of example 11.

FIG. 27 is a view which schematically shows part of electrode pattern of example 12.

DETAILED DESCRIPTION

Figure 4:
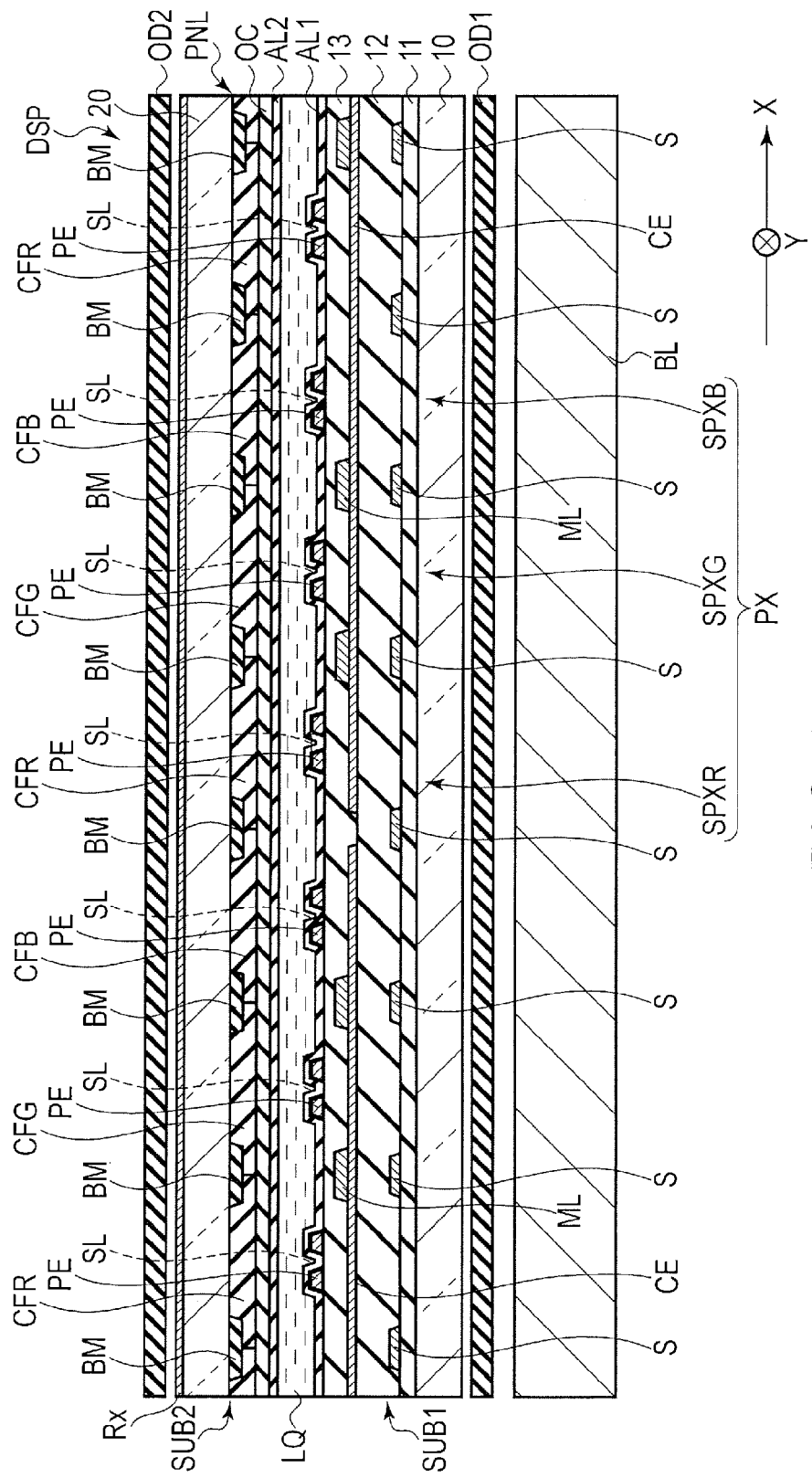
FIG. 4 is a cross-sectional view which schematically and partly shows the structure of the display device.

In general, according to one embodiment, a sensor-equipped display device includes a display panel and a detection electrode. The display panel includes a display area in which unit pixels are arranged in a matrix, each of unit pixels including a plurality of subpixels corresponding to different colors. The detection electrode includes conductive line fragments arranged on a detection surface which is parallel to the display area, and the electrode is configured to detect a contact or approach of an object to the detection surface. The detection electrode has an electrode pattern formed of the line fragments on a grid defined by first lines extending parallel to each other within the detection surface and second lines extending parallel to each other within the detection surface, the first lines and the second lines crossing each other to form intersections, and the line fragments selectively arranged between intersections adjacent to each other in the grid. An extending direction of the first lines, an extending direction of the second lines, and a diagonal line direction of the grid are tilted with respect to a first direction by an angle corresponding to arc tangent of a ratio between a value obtained by multiplying a first unit length of the unit pixel in the first direction by a first integer which is two or more and a value obtained by multiplying second unit length of the unit pixel in a second direction which is orthogonal to the first direction by a second integer which is two or more and different from the first integer. And the first direction is a direction in which, amongst the plurality of subpixels, subpixels having maximum luminosity for humans are aligned on the display area.

Hereinafter, embodiments of the present application will be explained with reference to accompanying drawings.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures as compared to actual embodiments for the sake of simpler explanation, and they are not to limit the interpretation of the invention of the present application. Furthermore, in the description and Figures of the present application, structural elements having the same or similar functions will be referred to by the same reference numbers and detailed explanations of them that are considered redundant may be omitted.

FIG. 1 is a perspective view which schematically shows the structure of a sensor-equipped display device of an embodiment. In this embodiment, a sensor-equipped display device is a liquid crystal display device. However, no limitation is intended thereby, and the display device may be self-luminous display devices such as an organic electroluminescent display device and the like, electronic paper display devices including electrophoresis elements and the like, and other flatpanel display devices. Furthermore, the sensor-equipped display device of the present embodiment may be adopted in various devices such as smartphones, tablet terminals, mobilephones, notebook computers, and gaming devices.

The liquid crystal display device DSP includes an active matrix type liquid crystal display panel PNL, driving IC chip IC1 which drives the liquid crystal display panel PNL, capacitive sensor SE, driving IC chip IC2 which drives the sensor SE, backlight unit BL which illuminates the liquid crystal panel PNL, control module CM, and flexible printed circuits FPC1, FPC2, and FPC3.

The liquid crystal display panel PNL includes a first substrate SUB1, second substrate SUB2 opposed to the first substrate SUB1, and liquid crystal layer (liquid crystal layer LQ which is described later) held between the first substrate SUB1 and the second substrate SUB2. In the present embodiment, the first substrate SUB1 may be reworded into an array substrate and the second substrate SUB2 may be reworded into a countersubstrate. The liquid crystal display panel PNL includes a display area (active area) DA which displays images. The liquid crystal display panel PNL is a transmissive type display panel having a transmissive display function which displays images by selectively transmitting the light from the backlight unit BL. The liquid crystal display panel PNL may be a transflective type display panel having a reflective display function which displays images by selectively reflecting external light in addition to the transmissive display function.

The backlight unit BL is disposed at the rear surface side of the first substrate SUB1. As a light source of the backlight unit BL, various models can be used including luminescent diode (light emitting diode, LED) and the like. If the liquid crystal display panel PNL is of reflective type having the reflective display function alone, the liquid crystal display device DSP does not necessarily include the backlight unit BL.

The sensor SE includes a plurality of detection electrodes Rx. The detection electrodes Rx are provided with a detection surface (X-Y flat surface) which is, for example, above and parallel to the display surface of the liquid crystal display panel PNL. In the example depicted, the detection electrodes Rx are extended substantially in direction X and are arranged side-by-side in direction Y. Otherwise, the detection electrodes Rx may be extended in direction Y and arranged side-by-side in direction X, or the detection electrodes Rx may be formed in an island shape and be arranged in a matrix in directions X and Y. In this embodiment, directions X and Y are orthogonal to each other.

The driving IC chip IC1 is mounted on the first substrate SUB1 of the liquid crystal display panel PNL. The flexible printed circuit FPC1 connects the liquid crystal display panel PNL with the control module CM. The flexible printed circuit FPC2 connects the detection electrodes Rx of the sensor SE with the control module CM. The driving IC chip IC2 is mounted on the flexible printed circuit FPC2. The flexible printed circuit FPC3 connects the backlight unit BL with the control module CM.

FIG. 2 is a view which schematically shows the basic structure and equivalent circuit of the liquid crystal display device DSP shown in FIG. 1. In addition to the liquid crystal display panel PNL, the liquid crystal display device DSP includes a source line driving circuit SD, gate line driving circuit GD, common electrode driving circuit CD within a non-display area NDA which is outside the display area DA.

The liquid crystal display panel PNL includes a plurality of subpixels SPX within the display area DA. The subpixels SPX are arranged in a matrix of i×j (i and j are positive integers) in directions X and Y. Subpixels SPX are provided to correspond to colors such as red, green, blue, and white. A unit pixel PX is composed of subpixels SPX those correspond to different colors, and is a minimum unit which constitutes a displayed color image. Furthermore, the liquid crystal display panel PNL includes j gate lines G (G1 to Gj), i source lines S (S1 to Si), and common electrode CE within the display area DA.

The gate lines G are extended substantially linearly in direction X to be drawn outside the display area DA and connected to the gate line driving circuit GD. Furthermore, the gate lines G are arranged in direction Y at intervals. The source lines S are extended substantially linearly in direction Y to be drawn outside the display area DA to cross the gate lines G. Furthermore, the source lines S are arranged in direction X at intervals. The gate lines G and the source lines S are not necessarily extended linearly and may be extended partly being bent. The common electrode CE is drawn outside the display area DA to be connected with the common electrode driving circuit CD. The common electrode CE is shared with a plurality of subpixels SPX. The common electrode CE is described later in detail.

FIG. 3 is a view which shows an equivalent circuit of the subpixel SPX shown in FIG. 2. Each subpixel SPX includes a switching element PSW, pixel electrode PE, common electrode CE, and liquid crystal layer LQ. The switching element PSW is formed of, for example, a thin film transistor. The switching element PSW is electrically connected to the gate line G and the source line S. The switching element PSW is of either top gate type or bottom gate type. The semiconductor layer of the switching element PSW is formed of, for example, polysilicon; however, it may be formed of amorphous silicon, oxide semiconductor, or the like. The pixel electrode PE is electrically connected with the switching element PSW. The pixel electrode PE is opposed to the common electrode CE. The common electrode CE and the pixel electrode PE form a retaining capacitance CS.

FIG. 4 is a cross-sectional view which schematically and partly shows the structure of the liquid crystal display device DSP. The liquid crystal display device DSP includes a first optical element OD1 and second optical element OD2 in addition to the above-described liquid crystal display panel PNL and backlight unit BL. The liquid crystal display panel PNL depicted in the Figure has a structure corresponding to a fringe field switching (FFS) mode as its display mode; however, no limitation is intended thereby, and the liquid crystal display panel PNL may have a structure which corresponds to another display mode.

The liquid crystal display panel PNL includes the first substrate SUB1, second substrate SUB2, and liquid crystal layer LQ. The first substrate SUB1 and the second substrate SUB2 are attached to each other with a certain cell gap formed therebetween. The liquid crystal layer LQ is held in the cell gap between the first substrate SUB1 and the second substrate SUB2.

The first substrate SUB1 is formed based on a transmissive first insulating substrate 10 such as a glass substrate or a resin substrate. The first substrate SUB1 includes the source lines S, common electrodes CE, pixel electrode PE, first insulating film 11, second insulating film 12, third insulating film 13, and first alignment film AL1 on the surface of the first insulating substrate 10 at the side opposed to the second substrate SUB2.

The first insulating film 11 is disposed on the first insulating substrate 10. Although this is not described in detail, the gate lines G, gate electrode of the switching element, and semiconductor layer are provided between the first insulating substrate 10 and the first insulating film 11. The source lines S are formed on the first insulating film 11. Furthermore, source electrode and drain electrode of the switching element PSW are formed on the first insulating film 11.

The second insulating film 12 is disposed on the source lines S and the first insulating film 11. The common electrode CE is formed on the second insulating film 12. This common electrode CE is formed of a transparent conductive material such as indium tin oxide (ITO) and indium zinc oxide (IZO). In the example depicted, a metal layer ML is formed on the common electrode CE to lower the resistance of the common electrode CE; however, this metal layer ML may be omitted.

The third insulating film 13 is disposed on the common electrodes CE and the second insulating film 12. The pixel electrodes PE are formed on the third insulating film 13. Each pixel electrode PE is disposed between adjacent source lines S to be opposed to the common electrode CE. Furthermore, each pixel electrode has a slit SL at a position to be opposed to the common electrode CE. This pixel electrode PE is formed of a transparent conductive material such as ITO or IZO. The first alignment film AL1 covers the pixels electrodes and the third insulating film 13.

On the other hand, the second substrate SUB2 is formed based on a transmissive second insulating substrate 20 such as a glass substrate or a resin substrate. The second substrate SUB2 includes black matrixes BM, color filters CFR, CFG, and CFB, overcoat layer OC, and second alignment film AL2 on the surface of the second insulating substrate 20 at the side opposed to the first substrate SUB1.

The black matrixes BM are formed on the inner surface of the second insulating substrate 20 to define the subpixels SPX one another.

Each of color filters CFR, CFG, and CFB is formed on the inner surface of the second insulating substrate 20 and partly overlaps the black matrix BM. Color filter CFR is a red filter which is disposed to correspond to a red subpixel SPXR and is formed of a red resin material. Color filter CFG is a green filter which is disposed to correspond to a green subpixel SPXG and is formed of a green resin material. Color filter CFB is a blue filter which is disposed to correspond to a blue subpixel SPXB and is formed of a blue resin material. In the example depicted, a unit pixel PX is composed of subpixels SPXR, SPXG, and SPXB those correspond to red, green, and blue, respectively. However, the unit pixel PX is not limited to a combination of the above-mentioned three subpixels SPXR, SPXG, and SPXB. For example, the unit pixel PX may be composed of four subpixels SPX including a white subpixel SPXW in addition to the subpixel SPXR, SPXG, and SPXB. In that case, a white or transparent filter may be disposed to correspond to the subpixel SPXW, or a color filter corresponding to the subpixel SPXW may be omitted. Or, a subpixel of a different color such as yellow may be disposed instead of a white subpixel.

The overcoat layer OC covers color filters CFR, CFG, and CFB. The overcoat layer OC is formed of a transparent resin material. The second alignment film AL2 covers the overcoat layer OC.

The detection electrode Rx is formed on the outer surface of the second insulating substrate 20. That is, in the present embodiment, the detection surface is disposed on the outer surface of the second insulating substrate 20. The detailed structure of the detection electrode Rx is described later.

As can be clearly understood from FIGS. 1 to 4, both the detection electrode Rx and the common electrode CE are disposed in different layers in the normal direction of the display area DA, and they are opposed to each other with dielectrics intervening therebetween such as third insulating film 13, first alignment film AL1, liquid crystal layer LQ, second alignment film AL2, overcoat layer OC, color filters CFR, CFG, and CFB, and second insulating substrate 20.

The first optical element OD1 is interposed between the first insulating substrate 10 and the backlight unit BL. The second optical element OD2 is disposed above the detection electrode Rx. Each of the first optical element OD1 and the second optical element OD2 includes at least a polarizer and may include a retardation film if necessary.

Now, a display driving operation performed to display images in the liquid crystal display device DSP in the above-described FFS mode is described. First, the off-state where no voltage is applied to the liquid crystal layer LQ is explained. The off-state is a state where a potential difference is not formed between the pixel electrode PE and the common electrode CE. In this off-state, liquid crystal molecules in the liquid crystal layer LQ are aligned in the same orientation within X-Y plane as their initial alignment by the alignment restriction force between the first alignment film AL1 and the second alignment film AL2. The light from the backlight unit BL partly transmits the polarizer of the first optical element OD1 and is incident on the liquid crystal display panel PNL. The light incident on the liquid crystal display panel PNL is linear polarization which is orthogonal to an absorption axis of the polarizer. The state of the linear polarization does not substantially change when passing though the liquid crystal display panel PNL in the off-state. Thus, the majority of the linear polarization which have passed through the liquid crystal display panel PNL are absorbed by the polarizer of the second optical element OD2 (black display).

Next, the on-state where a voltage is applied to the liquid crystal layer LQ is explained. The on-state is a state where a potential difference is formed between the pixel electrode PE and the common electrode CE. That is, common driving signals are supplied to the common electrode CE to set it to the common potential. Furthermore, image signals to form the potential difference with respect to the common potential are supplied to the pixel electrode PE. Consequently, a fringe field is generated between the pixel electrode PE and the common electrode CE in the on-state. In this on-state, the liquid crystal molecules are aligned in the orientation different from that of the initial alignment within X-Y plane. In the on-state, the linear polarization which is orthogonal to the absorption axis of the polarizer of the first optical element OD1 is incident on the liquid crystal display panel PNL and its polarization state changes depending on the alignment of the liquid crystal molecules when passing through the liquid crystal layer LQ. Thus, in the on-state, at least part of the light which has passed through the liquid crystal layer LQ transmits the polarizer of the second optical element OD2 (white display). With this structure, a normally black mode is achieved.

Now, the capacitive sensor SE mounted on the liquid crystal display device DSP of the present embodiment is explained. FIG. 5 is a plan view which schematically shows a structural example of the sensor SE. In the example depicted, the sensor SE is composed of the common electrode CE of the first substrate SUB1 and the detection electrodes Rx of the second substrate SUB2. That is, the common electrode CE functions as an electrode for display and also as an electrode for sensor driving.

The liquid crystal display panel PNL includes lead lines L in addition to the common electrode CE and the detection electrodes Rx. The common electrode CE and the detection electrodes Rx are disposed within the display area AA. In the example depicted, the common electrode CE includes a plurality of divisional electrodes C. Divisional electrodes C are extended substantially linearly in direction Y and arranged at intervals in direction X within the display area DA. The detection electrodes Rx are extended substantially linearly in direction X and arranged at intervals in direction Y within the display area DA. That is, the detection electrodes Rx are extended to cross the divisional electrodes C. As mentioned above, the common electrode CE and the detection electrodes Rx are opposed to each other with various dielectrics intervening therebetween.

The number, size, and shape of the divisional electrodes C are not limited specifically and can be changed arbitrarily. Furthermore, the divisional electrodes C may be arranged at intervals in direction Y and extended substantially linearly in direction X. Moreover, the common electrode CE is not necessarily divided and may be a single plate electrode formed continuously within the display area DA.

Within the detection surface on which the detection electrodes Rx are disposed, dummy electrodes DR are provided between adjacent detection electrodes Rx. The dummy electrodes DR are extended substantially linearly in direction X similarly to the detection electrodes Rx. These dummy electrodes DR are not connected with the lines such as lead lines L, and are in the electrically floating state. The dummy electrodes DR do not play any role in detection of a contact or approach of an object. That is, the dummy electrodes DR are not necessary from the object detection standpoint. However, without such dummy electrodes DR, the screen display of the liquid crystal display panel PNL will be optically nonuniform. Therefore, the dummy electrodes DR should preferably be provided.

The lead lines L are disposed within the non-display area NDA and are electrically connected to the detection electrodes Rx one to one. Each of the lead lines L outputs a sensor output value from its corresponding detection electrode Rx. The lead lines L are disposed in the second substrate SUB2 similarly to the detection electrodes Rx, for example.

The liquid crystal display device DSP further includes the common electrode driving circuit CD disposed within the non-display area NDA. Each of the divisional electrodes C is electrically connected to the common electrode driving circuit CD. The common electrode driving circuit CD selectively supplies common driving signals (first driving signals) to drive the subpixels SPX and sensor driving signals (second driving signals) to drive the sensor SE to the common electrode CE. For example, the common electrode driving circuit CD supplies the common driving signals to the common electrode CE in a display driving time to display images on the display area DA and supplies sensor driving signals in a sensor driving time to detect a contact or approach of an object to the detection surface.

The flexible printed circuit FPC2 is electrically connected to each of the lead lines L. A detection circuit RC is accommodated in, for example, the driving IC chip IC2. The detection circuit RC detects a contact or approach of an object to the liquid crystal display device DSP base on the sensor output value from the detection electrodes Rx. Furthermore, the detection circuit RC can detect positional data of the position to which the object contacts or approaches. The detection circuit RC may be accommodated in the control module CM instead.

Figure 6:
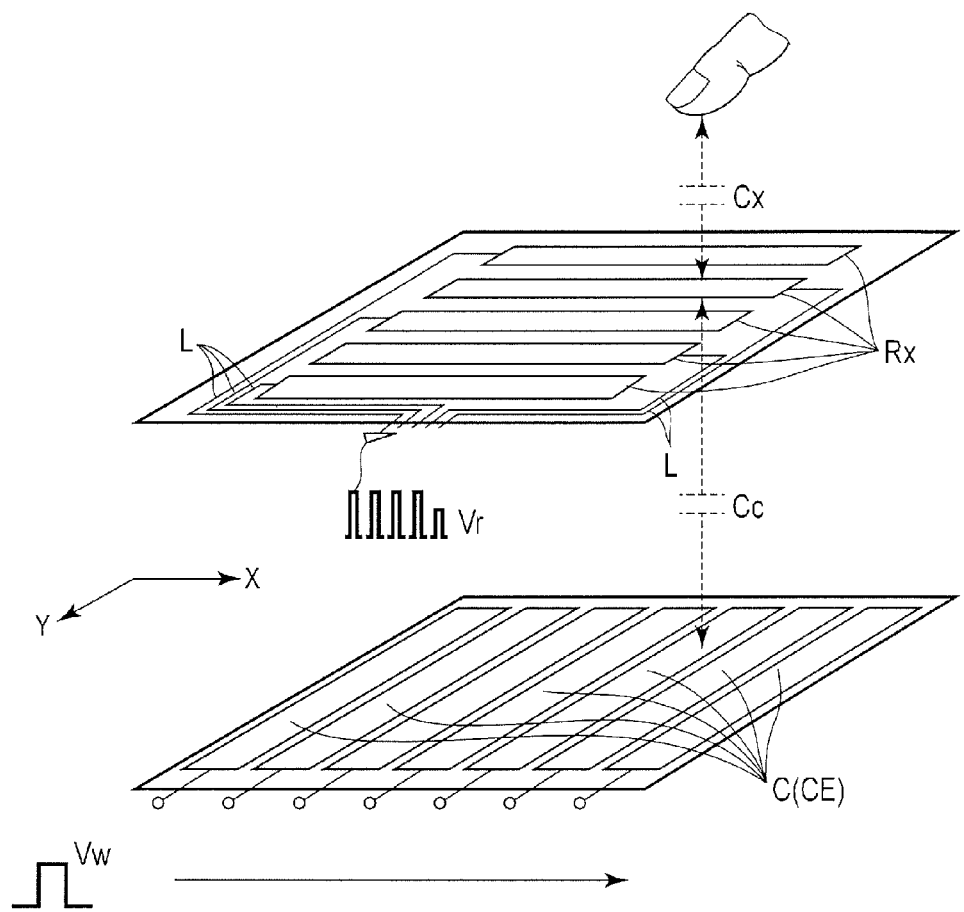
FIG. 6 is a view which illustrates a principle of sensing (mutual-capacitive sensing method) performed by the sensor of the display device.

Now, the specific operation performed in detecting a contact or approach of an object by the liquid crystal display device DSP is explained with reference to FIG. 6. A capacitance Cc exists between the divisional electrodes C and the detection electrodes Rx. The common electrode driving circuit CD supplies pulse-shaped sensor driving signals Vw to each of the divisional electrodes C at certain periods. In the example depicted, a finger of a user is given to be close to a crossing point of a particular detection electrode Rx and a particular divisional electrode C. The finger close to the detection electrode Rx generates a capacitance Cx. When the pulse-shaped sensor driving signals Vw are supplied to the divisional electrodes C, the particular detection electrode Rx shows a pulse-shaped sensor output value Vr of which level is less than those are obtained from the other detection electrodes. This sensor output value Vr is supplied to the detection circuit RC through the lead lines L.

The detection circuit RC detects two-dimensional positional data of the finger within the X-Y plane (detection surface) based on the timing when the sensor driving signals Vw are supplied to the divisional electrodes C and the sensor output value Vr from each detection electrode Rx. Furthermore, capacitance Cx varies between the states where the finger is close to the detection electrode Rx and where the finger is distant from the detection electrode Rx. Thus, the level of the sensor output value Vr varies between the states where the finger is close to the detection electrode Rx and where the finger is distant from the detection electrode Rx. Using this mechanism, the detection circuit RC may detect the proximity of the finger with respect to the sensor SE (distance between the finger and the sensor SE in the normal direction) based on the level of the sensor output value Vr.

The above-explained detection method of the sensor SE is referred to as a mutual-capacitive method or a mutual-capacitive sensing method. The detection method applied to the sensor SE is not limited to such a mutual-capacitive sensing method and may be other methods. For example, the following methods may be applied to the sensor SE: a self-capacitive method, a self-capacitive sensing method, and the like.

Figure 7:
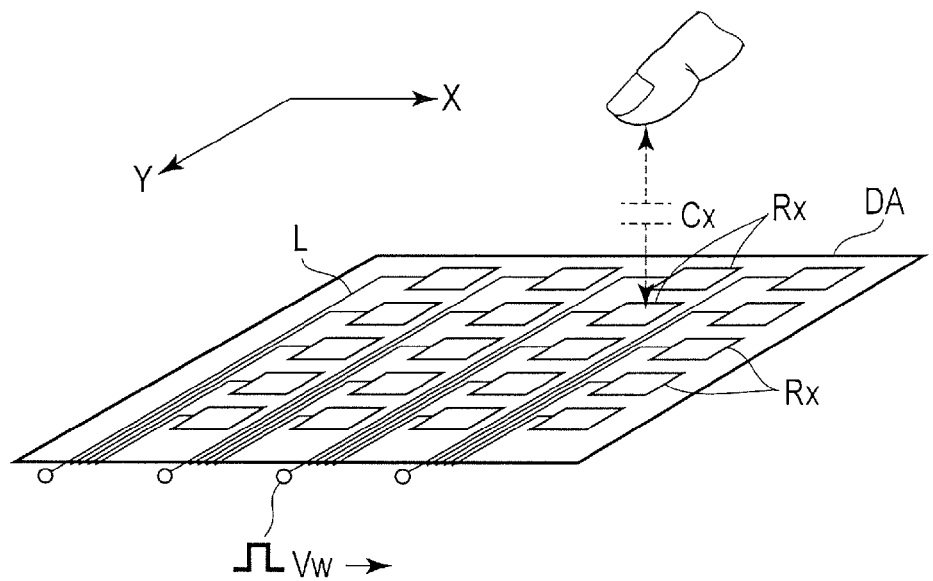
FIG. 7 is a view which illustrates another principle of sensing (self-capacitive sensing method) performed by the sensor of the display device.
Figure 8:
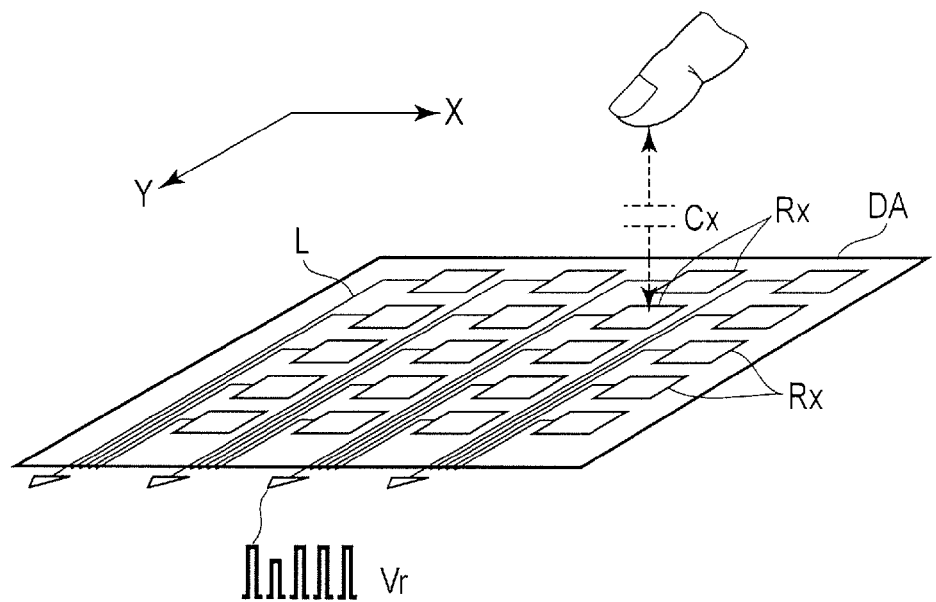
FIG. 8 is a view which illustrates said another principle of sensing (self-capacitive sensing method) performed by the sensor of the display device.

FIGS. 7 and 8 show the specific operation performed in detecting a contact or approach of an object by the liquid crystal display device DSP using the self-capacitive sensing method. In FIGS. 7 and 8, the detection electrodes Rx are formed as islands and arranged in a matrix along directions X and Y on the display area DA. The lead lines L are electrically connected to the detection electrodes Rx one to one at their ends. The other ends of the lead lines L are, as in the example shown in FIG. 5, connected to the flexible printed circuit FPC2 including the driving IC chip IC2 in which the detection circuit RC is accommodated. In the example depicted, a finger of a user is given to be close to a particular detection electrode Rx. The finger close to the detection electrode Rx generates a capacitance Cx.

As shown in FIG. 7, the detection circuit RC supplies pulse-shaped sensor driving signals Vw (driving voltage) to each of the detection electrodes Rx at certain periods. By the sensor driving signals Vw, each detection electrode Rx itself is charged.

After the sensor driving signal Vw supply, the detection circuit RC reads the sensor output value Vr from each of the detection electrodes Rx as shown in FIG. 8. The sensor output value Vr corresponds to, for example, the charge on each detection electrode Rx itself. In the detection electrodes Rx arranged on the X-Y plane (detection surface), the sensor output value Vr read from the detection electrode Rx at which a capacitance Cx is generated between itself and the finger is different from the sensor output values Vr read from the other detection electrodes Rx. Therefore, the detection circuit RC can detect the two-dimensional positional data of the finger on the X-Y plane based on the sensor output values Vr of the detection electrodes Rx.

Now, a specific example of how to drive the sensor SE in the self-capacitive sensing method is explained with reference to FIG. 9. In the example depicted, a display operation performed in a display operation period Pd and a detection operation of input positional data performed in a detection operation period Ps within one frame (1F) period. The detection operation period Ps is a period excluded from the display operation period Pd and is, for example, a blanking period in which the display operation halts.

In the display operation period Pd, the gate line driving circuit GD supplies control signals to the gate lines G, the source line driving circuit SD supplies image signals Vsig to the source lines S, and the common electrode driving circuit CD supplies common driving signals Vcom (common voltage) to the common electrode CE (divisional electrodes C) for the drive of the liquid crystal display panel PNL.

In the detection operation period Ps, the input of control signal, image signal Vsig, and common driving signal Vcom to the liquid crystal display panel PNL are stopped and the sensor SE is driven. When driving the sensor SE, the detection circuit RC supplies sensor driving signals Vw to the detection electrodes Rx, reads the sensor output values Vr indicative of changes in capacitance in the detection electrodes Rx, and operates the input positional data based on the sensor output values Vr. In this detection operation period Rs, the common electrode driving circuit CD supplies potential adjustment signals Va, of which waveform is the same as that of the sensor driving signals Vw supplied to the detection electrodes Rx, to the common electrode CE in synchronization with sensor driving signals Vw. Here, the same waveform means that the sensor driving signals Vw and the potential adjustment signals are the same with respect to their phase, amplitude, and period. By supplying such potential adjustment signals Va to the common electrode CE, a stray capacitance (parasitic capacitance) between the detection electrodes Rx and the common electrode CE can be removed and the operation of the input positional data can be performed accurately.

Figure 10:
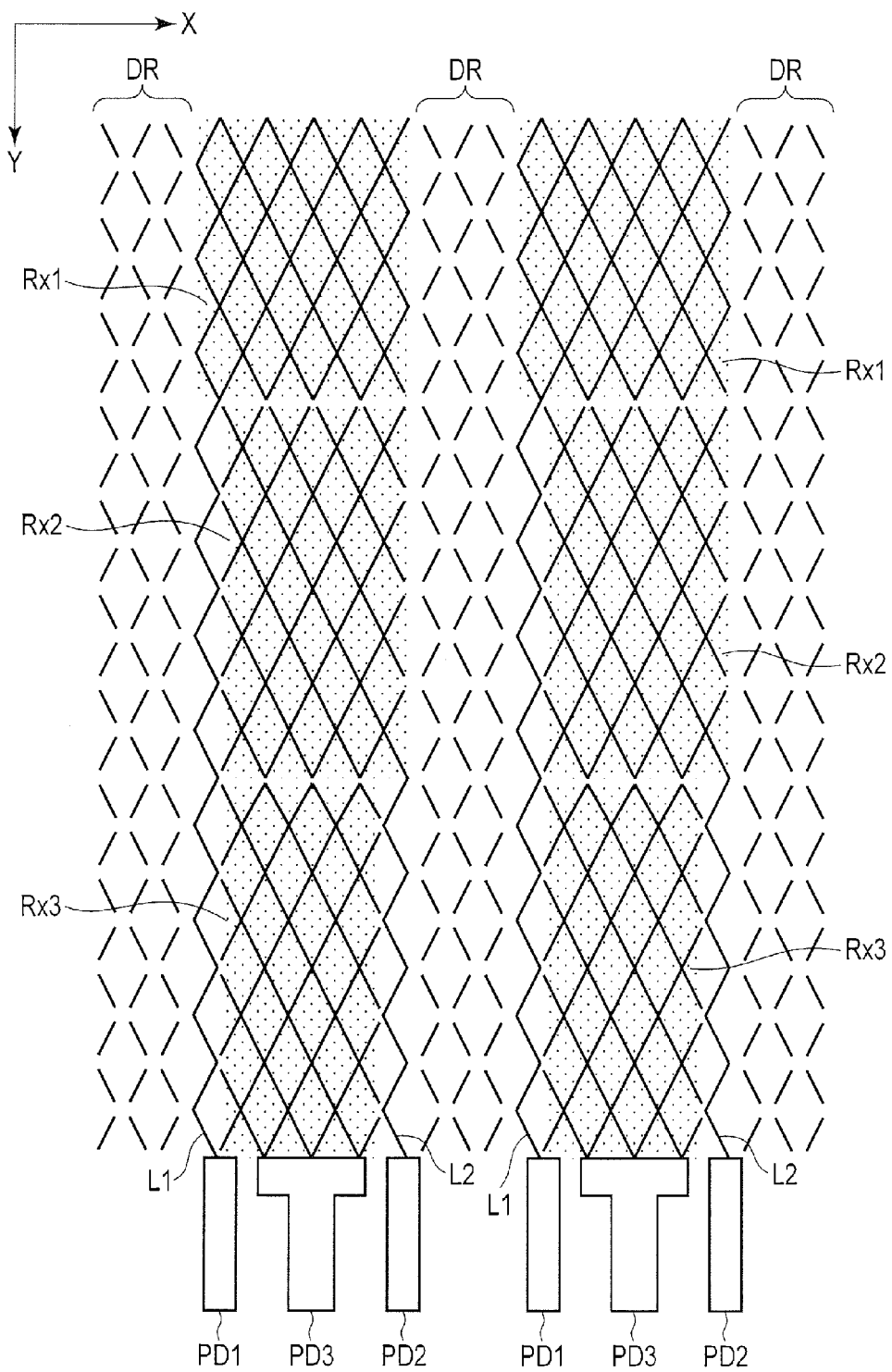
FIG. 10 is a view which schematically shows detection electrodes of the sensor of the display device, which are arranged in a matrix.

FIG. 10 is a view which schematically shows an example of the detection electrodes Rx arranged in a matrix. In the example depicted, detection electrodes Rx1, Rx2, and Rx3 are aligned in direction Y. Detection electrodes Rx1 are connected to pads PD1 through lead lines L1. Detection electrodes Rx2 are connected to pads PD2 through lead lines L2. Detection electrodes Rx3 are directly connected to pads PD3. Pads PD1 to PD3 are connected to flexible printed circuit FPC2. Detection electrodes Rx1 to Rx3 are, for example, formed in a mesh structure of metal material line fragments (line fragments T described later) connected to each other. However, the structure of detection electrodes Rx1 to Rx3 is not limited to that shown in FIG. 10 and may be replaced with one of various structures including the structures described in the following example.

In direction X, detection electrodes Rx1 to Rx3, lead lines L1 and L2, and pads PD1 to PD3 are aligned at certain intervals. Between a set of detection electrodes Rx1 to Rx3 and its adjacent sets of detection electrodes Rx1 to Rx3 in direction X, dummy electrodes DR are disposed. The dummy electrodes DR are formed in a mesh structure of line fragments as in detection electrodes Rx1 to Rx3. However, the line fragments of the dummy electrode DR are not connected to each other or connected to any of detection electrodes Rx1 to Rx3, lead lines L1 and L2, and pads PD1 to PD3. That is, the line fragments of the dummy electrode DR are in the electrically floating state. By arranging the detection electrodes Rx and the dummy electrodes DR which are alike in shape, the screen display of the liquid crystal display panel PNL can be maintained optically uniform.

Next, the detailed structure of the detection electrodes Rx is explained. Note that the structure of the detection electrodes Rx can be applied to various detection methods including the above-described mutual-capacitive sensing method, self-capacitive sensing method, and the like.

The detection electrodes Rx have an electrode pattern of metal material line fragments (line fragments T described later) combined together. The line fragment is formed of a metal material such as aluminum (Al), titan (Ti), silver (Ag), molybdenum (Mo), tungsten (W), copper (Cu), and chrome (Cr), or of an alloy including such a material. The width of the line fragment should preferably be set to fall within such a range that does not decrease the transmissivity of each pixel while maintaining a certain resistance to a break. For example, the width may be set to fall within a range between 3 μm and 10 μm inclusive. For example, the line fragment may also be called as a conductive fragment, a metal fragment, a thin fragment, a unit fragment, a conductive line, a metal line, a thin line, or a unit line.

Figure 11:
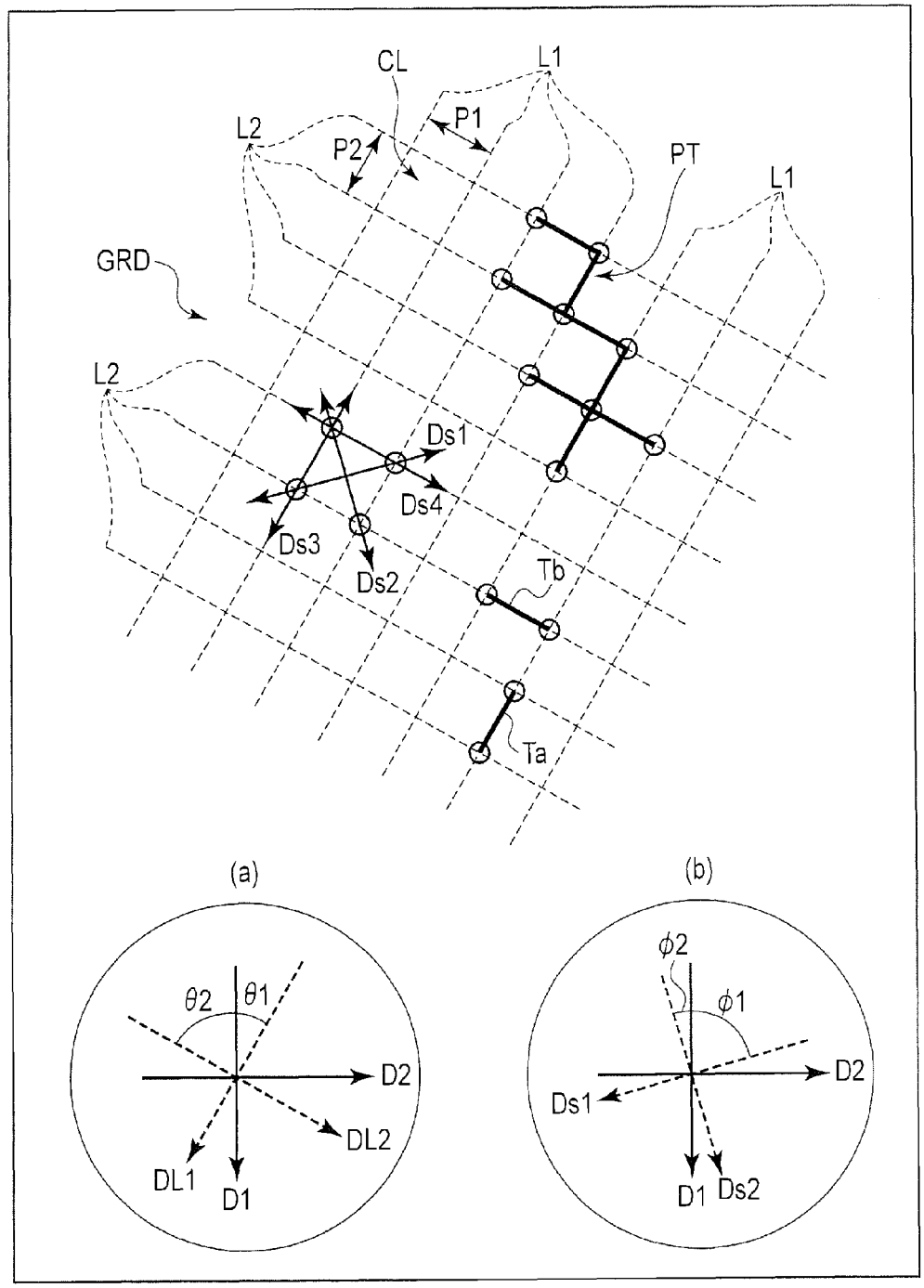
FIG. 11 is a view which illustrates an electrode pattern of the detection electrodes of the sensor of the display device.

The electrode pattern of the detection electrode Rx is explained with reference to FIG. 11. Before determining the electrode pattern, an imaginary grid GRD is given initially as shown in FIG. 11. The imaginary grid GRD is defined by a plurality of first lines L1 parallel to each other and arranged at pitch P1 intervals and a plurality of second lines L2 parallel to each other and arranged at pitch P2 intervals. In FIG. 11, pitch P1 and pitch P2 are equal (P1=P2) and the first lines L1 and the second lines L2 are orthogonal to each other. That is, in the example shown in FIG. 11, a cell CL defined by two adjacent first lines L1 and two adjacent second lines L2 is a square. Pitch P1 and pitch P2 may be different from each other. Furthermore, first lines L1 and second lines L2 may cross at an acute (or obtuse) angle.

The electrode pattern PT of the detection electrodes Rx is a pattern formed by selectively arranging line fragments T between two adjacent intersections of first lines L1 and second lines L2 contained in such a grid GRD. In the present embodiment, the adjacent intersections are consecutive two intersections on a single first line L1 and consecutive two intersections on a single second line L2. That is, as a line fragment T, either line fragment Ta or line fragment Tb shown in FIG. 11 can be used.

As shown in FIG. 11(a), first lines L1 are extended in direction DL1 which is tilted at angle θ1 with respect to a first direction D1 (pixel arrangement direction) and second lines L2 extended in direction DL2 which is tilted at angle θ2 with respect to direction D1. First direction D1 forms clockwise angle and counterclockwise angle with direction DL1, and angle θ1 corresponds to the smaller one. That is, angle θ1 is 90° or less. Furthermore, first direction D1 forms clockwise angle and counterclockwise angle with direction DL2, and angle θ2 corresponds to the smaller one. That is, angle θ2 is 90° or less. In the display area DA, subpixels SPX which possess maximum luminosity for humans (the human eye) are aligned in first direction D1. Note that a direction orthogonal to first direction D1 is defined as second direction D2.

A relationship between subpixels SPX and first direction D1 is explained here with reference to FIG. 12. FIG. 12 shows a part of the unit pixels PX arranged in direction X and direction Y in the display area DA. Each unit pixel PX is composed of red, green, and blue subpixels SPXR, SPXG, and SPXB. Red, green, and blue subpixels SPX are aligned in direction Y. Amongst red, green, and blue, the color possessing maximum luminosity for humans is green. Therefore, in the example depicted, first direction D1 matches direction Y in which green subpixels SPXG are aligned. Furthermore, second direction D1 matches direction X.

Now, conditions for determining first lines L1 and second lines L2 are explained. As shown in FIG. 12, the length of a unit pixel PX in first direction D1 is defined as first unit length d1 and the length of a unit pixel PX in second direction D2 is defined as second unit length d2.

Angles θ1 and θ2 formed by directions DL1 and DL2 of first lines L1 and second lines L2 with respect to the first direction D1, and pitch P1 and pitch P2 of first lines L1 and second lines L2 are determined to satisfy the following conditions 1 and 2.

[Condition 1]

First lines L1 and second lines L2 are tilted with respect to first direction D1 by the angles (θ1 and θ2) corresponding to arc tangent (atan) of the ratio between the value obtained by multiplying first unit length d1 by a first integer M (M≥2) and the value obtained by multiplying second unit length d2 by a second integer N (N≥2 and M≠N).

In order to define the grid GRD, a combination of first integer M and second integer N used to determine the tilt of first lines L1 must be different from a combination of first integer M and second integer N used to determine the tilt of second lines L2. Given that the first integer M and second integer N used to determine the tilt of first lines L1 are first integer M1 (M1≥2) and second integer N1 (N1≥2 and M1≠N1) and the first integer M and second integer N used to determine the tilt of second lines L2 are first integer M2 (M2≥2) and second integer N2 (N2≥2 and M2≠N2), condition 1 can be represented by the following formulae (1) and (2).

$$\theta1 = \text{atan}\,[(N1 \times d2)/(M1 \times d1)] \quad (1)$$

$$\theta2 = \text{atan}\,[(N2 \times d2)/(M2 \times d1)] \quad (2)$$

where M1:N1≠M2:N2

[Condition 2]

In the grid GRD, arrangement directions Ds on intersections of first lines L1 and second lines L2 are tilted with respect to first direction D1 by the angles corresponding to arc tangent (atan) of the ratio between the value obtained by multiplying first unit length d1 by a first integer m (m≥2) and the value obtained by multiplying second unit length d2 by a second integer n (n≥2 and m≠n).

Here, as the arrangement direction Ds on the intersections, first arrangement direction Ds1, second arrangement direction Ds2, third arrangement direction Ds3, and fourth arrangement direction Ds4 are given in FIG. 11. First arrangement direction Ds1 and second arrangement direction Ds2 extend in the diagonal lines of each cell CL in the grid GRD. Third arrangement direction Ds3 is parallel to the first lines L1. Fourth arrangement direction Ds4 is parallel to the second lines L2. As can be understood from FIG. 11, third arrangement direction Ds3 and fourth arrangement direction Ds4 satisfy condition 2 as long as the first line L1 and second line L2 satisfy the above condition 1. Therefore, only first arrangement direction Ds1 and second arrangement direction Ds2 should satisfy the above tilting conditions to conform to condition 2.

As shown in FIG. 11(b), the tilt angle of first arrangement direction Ds1 with respect to first direction D1 is defined as φ1 and the tilt angle of second arrangement direction Ds2 with respect to first direction D1 is defined as φ2. First arrangement direction Ds1 and first direction D1 form clockwise angle and counterclockwise angle, and angle φ1 corresponds to the smaller one. That is, angle φ1 is 90° or less. Furthermore, second arrangement direction Ds2 and first direction D1 form clockwise angle and counterclockwise angle, and angle φ2 corresponds to the smaller one. That is, angle φ2 is 90° or less. Given that the first integer m and second integer n used to determine the tilt of first arrangement direction Ds1 are first integer m1 (m1≥2) and second integer n1 (n1≥2 and m1≠n1), respectively, and the first integer m and second integer n used to determine the tilt of second arrangement direction Ds2 are first integer m2 (m2≥2) and second integer n2 (n2≥2 and m2≠n2), respectively, condition 2 can be represented by the following formulae (3) and (4).

$$\varphi 1 = \operatorname{atan}\left[(n1 \times d2)/(m1 \times d1)\right] \quad (3)$$

$$\varphi 2 = \operatorname{atan}\left[(n2 \times d2)/(m2 \times d1)\right] \quad (4)$$

where m1:n1≠m2:n2

Angles θ1 and θ2 and pitch P1 and pitch P2 are determined to satisfy the above conditions 1 and 2.

Now, the reasons why the above conditions 1 and 2 are adopted are explained.

The reason why condition 1 is adopted is explained first with reference to FIGS. 13 and 14. FIG. 13 indicates results of the tests performed to evaluate moiré on the liquid crystal display panels PNL of type (A) and type (B) with electrode patterns composed of a plurality of linear metal lines arranged parallel to each other at certain intervals, the linear metal lines having substantially the same width as that of the line fragments Ta and Tb and the electrode patterns. As shown in FIG. 12, the liquid crystal display panel PNL of type (A) includes a display area DA in which a plurality of unit pixels PX are arranged in a matrix in both directions X and Y, each unit pixel PX composed of red subpixel SPXR, green subpixel SPXG, and blue subpixel SPXB arranged in direction X. The unit pixel PX of the type (A) has first unit length d1 and second unit length d2 both being 90 µm. As described in the explanation of FIG. 12, first direction D1 corresponds to direction Y and second direction D2 corresponds to direction X in the type (A).

As shown in FIG. 14, the liquid crystal display panel PNL of type (B) includes a display area in which a plurality of unit pixels PX are arranged in a matrix in both directions X and Y, each unit pixel PX composed of red subpixel SPXR, green subpixel SPXG, blue subpixel SPXB, white subpixel SPXW arranged in direction X. The unit pixel PX of the type (B) has first unit length d1 of 90 µm and second unit length d2 of 120 µm. Amongst red, green, blue, and white, the color possessing the maximum luminosity for humans is white. Therefore, in the example depicted in FIG. 14, first direction D1 corresponds to direction Y in which white subpixels SPXW are aligned. Furthermore, second direction D2 corresponds to direction X.

The tests were carried out to evaluate moiré on both the liquid crystal display panels of type (A) and type (B) using the electrode patterns of evaluation examples E101 to E121 as shown in FIG. 13. Each of evaluation examples E101 to E121 shows the evaluation of moiré occurring when the tilt angle formed by the metal lines of each electrode pattern with first direction D1 was changed by angle θ. Angle θ corresponds to arc tangent of the ratio between the value obtained by multiplying first unit length d1 by first integer M and the value obtained by multiplying second unit length d2 by second integer N. First integer M and second integer N were changed from 0 to 6. The values of first integer M, second integer N, and angle θ in each of evaluation examples E101 to E121 are as shown in FIG. 13. For the referential sake, the extending directions of the metal line of each of evaluation examples E101 to E121 are indicated by the arrows on the display area DA of the type (B) starting from the origin O at the upper left of FIG. 14. For example, in evaluation example E101, first integer M is 1 and second integer N is 0. Therefore, the arrow indicating the extending direction of the metal line of evaluation example E101 starts from the origin O going toward a position 1×d1 in first direction D1 and 0×d2 (=0) in second direction D2. Furthermore, for example, in evaluation example E110, first integer M is 6 and second integer N is 5. Therefore, the arrow indicating the extending direction of the metal line of evaluation example E110 starts from the origin O going toward a position 6×d1 in first direction D1 and 5×d2 in second direction D2.

In the evaluations, the moiré was rated on a scale of 1 to 6 where scale 1 corresponds to the best display quality (least influenced by moiré) and scale 6 corresponds to the poorest display quality (most influenced by moiré). Scales 1 to 6 are hereinafter referred to as levels 1 to 6. As a result, in both the type (A) and the type (B), evaluation examples E101 and E121 indicated level 6, evaluation example E111 indicated level 5, evaluation examples E102 to E105 and E117 to E120 indicated level 4, evaluation examples E107 and E115 indicated level 3, evaluation examples E106 and E116 indicated level 2, and evaluation examples E108 to E110 and E112 to E114 indicated level 1.

As obvious from these evaluations, moiré occurs frequently when angle θ formed by the metal line of the electrode pattern and first direction D1 is approximately 0°, 45°, or 90°. Arguably, this is because, when angle θ takes these degrees, a contrast pattern generated by the metal lines and the subpixels SPX in the display area DA (in particular, the subpixels having the maximum luminosity for humans) overlapping with each other will appear in a cycle easily visible to humans.

Furthermore, as obvious from these evaluations, relatively fine evaluation results (levels 1 to 3) can be obtained when both first integer M and second integer N are 2 or more (M and N≥2). However, when both first integer M and second integer N are the same, angle θ takes the value which corresponds to evaluation example E111, and thus, the evaluation result is, as in evaluation example E111, no good. As can be understood from this point, first integer M and second integer N must be different (M≠N).

The evaluation results of the electrode patterns including the above linear metal lines will be the same if the evaluations are performed with respect to the line fragments Ta and Tb. That is, when the line fragments Ta and Tb are tilted with respect to first direction D1 at angles θ showing the good results in the above evaluations, moiré can be prevented or reduced.

In the present embodiment, line fragments Ta extend in parallel to first lines L1 and line fragments Tb extend in parallel to second lines L2. Therefore, when first lines L1 and second lines L2 are tilted with respect to first direction D1 at angles θ those showed the good results in the above evaluations, moiré caused by the interference between the line fragments Ta and Tb and the display area DA can be prevented or reduced. As above, condition 1 is derived.

Furthermore, as obvious from the level 1 results obtained in evaluation examples E108 to E110 and E112 to E114, moiré can be prevented or reduced much better when the absolute value of the difference between the first integer M and the second integer N is 1 (|M−N|=1) while satisfying condition 1. For example, in order to apply this condition to the first lines L1, angle θ1 is determined such that the absolute value of the difference between the first integer M1 and the second integer N1 takes 1 (|M1−N1|=1). Or, in order to apply this condition to the second lines L2, angle θ2 is determined such that the absolute value of the difference between the first integer M2 and the second integer N2 takes 1 (|M2−N2|=1).

In evaluation examples E107 and E115, although the absolute value of the difference between the first integer M and the second integer N was 1, the evaluation result indicated level 3, respectively. From this point, if the first integer M and the second integer N are both 3 or more (M and N≥3), moiré can be prevented or reduced more efficiently.

Now, the reason why condition 2 is adopted is explained with reference to FIG. 15. FIG. 15 indicates results of the tests performed to evaluate moiré on the above-mentioned liquid crystal display panels PNL of type (A) and type (B) with electrode patterns including a crossing point group arranged in the arrangement direction tilted with respect to first direction D1 at angles φ defined in evaluation examples E201 to E221. The intersections included in these electrode patterns are formed by crossing two metal thin lines having substantially the same width as that of the line fragments Ta and Tb. Angles φ in evaluation examples E201 to E221 correspond to arc tangent of the ratio between the value obtained by multiplying first unit length d1 by first integer m and the value obtained by multiplying second unit length d2 by second integer n. First integer m and second integer n were changed from 0 to 6. The values of first integer m, second integer n, and angle φ in each of evaluation examples E201 to E221 are as shown in FIG. 15. For example, when the display area DA of the type (B) is used, the arrangement directions of the crossing point groups of evaluation examples E201 to E221 correspond to the arrows of evaluation examples E101 to E121 indicated in FIG. 14, respectively.

The evaluation target here is moiré generated by the interference between the crossing point of the metal thin lines and the display area DA. At the crossing point of the metal thin lines, an area of the metal thin lines per unit area increases and the transmissivity of the light from the display area DA decreases. Therefore, on the display area DA, a line of low transmissivity is generated due to the intersections of the metal thin lines along the arrangement direction, and the line of low transmissivity crosses subpixels SPX to generate moiré.

As in FIG. 13, the moiré was rated on a scale of 1 to 6 (levels 1 to 6). In the evaluations, in both the type (A) and the type (B), evaluation examples E201 and E221 indicated level 6, evaluation example E211 indicated level 5, evaluation examples E202 to E205 and E217 to E220 indicated level 4, evaluation examples E206 and E216 indicated level 2, evaluation examples E207 to E210 and E212 to E215 indicated level 1.

As obvious from these evaluations, moiré occurs frequently when angle φ formed by the arrangement direction of the crossing point group and first direction D1 is approximately 0°, 45°, or 90°. Arguably, this is because, when angle φ takes these degrees, a contrast pattern generated by each crossing point and the subpixels SPX in the display area DA (in particular, the subpixels having the maximum luminosity for humans) overlapping with each other will appear in a cycle easily visible to humans.

Furthermore, as obvious from these evaluations, relatively fine evaluation results (levels 1 and 2) can be obtained when both first integer m and second integer n are 2 or more (m and n≥2). However, when both first integer m and second integer n are the same, angle φ takes the value which corresponds to evaluation example E211, and thus, the evaluation result is, as in evaluation example E211, no good. As can be understood from this point, first integer m and second integer n must be different (m≠n).

The evaluation results of the electrode patterns including the above intersections are applicable if the evaluations are performed with respect to joints of the line fragments Ta and line fragments Tb in the above-mentioned electrode patterns PT arranged on the grid GRD. Possible conditions of such joints are: a joint of a single line fragment Ta and a single line fragment Tb connected with each other at their ends; a joint of two line fragments Ta and a single line fragment Tb connected with each other at their ends; a joint of a single line fragment Ta and two line fragments Tb connected with each other at their ends; and a joint of two line fragments Ta and two line fragments Tb connected with each other at their ends.

As can be understood from FIG. 11, the joints of line fragments Ta and Tb in the electrode patterns PT are on the intersections of the first lines L1 and the second lines L2. Therefore, when the first to fourth arrangement directions Ds1 to Ds4 of the intersections on the grid GRD are tilted with respect to first direction D1 at angles φ those showed the good results in the above evaluations, moiré caused by the interference between the line fragments Ta and Tb and the display area DA can be prevented or reduced. As above, condition 2 is derived.

Furthermore, as obvious from the level 1 results obtained in evaluation examples E207 to E210 and E212 to E215, moiré can be prevented or reduced much better when the absolute value of the difference between the first integer m and the second integer n is 1 (|m−n|=1) while satisfying condition 2. For example, in order to apply this condition to the first arrangement direction Ds1, angle φ1 is determined such that the absolute value of the difference between the first integer m1 and the second integer n1 takes 1 (|m1−n1|=1). Or, in order to apply this condition to the second arrangement direction Ds2, angle φ2 is determined such that the absolute value of the difference between the first integer m2 and the second integer n2 takes 1 (|m2−n2|=1).

Now, presented are examples 1 to 13 of the electrode patterns PT on a grid GRD in which line fragments Ta and Tb are arranged to satisfy above conditions 1 and 2.

EXAMPLE 1

Figure 16:
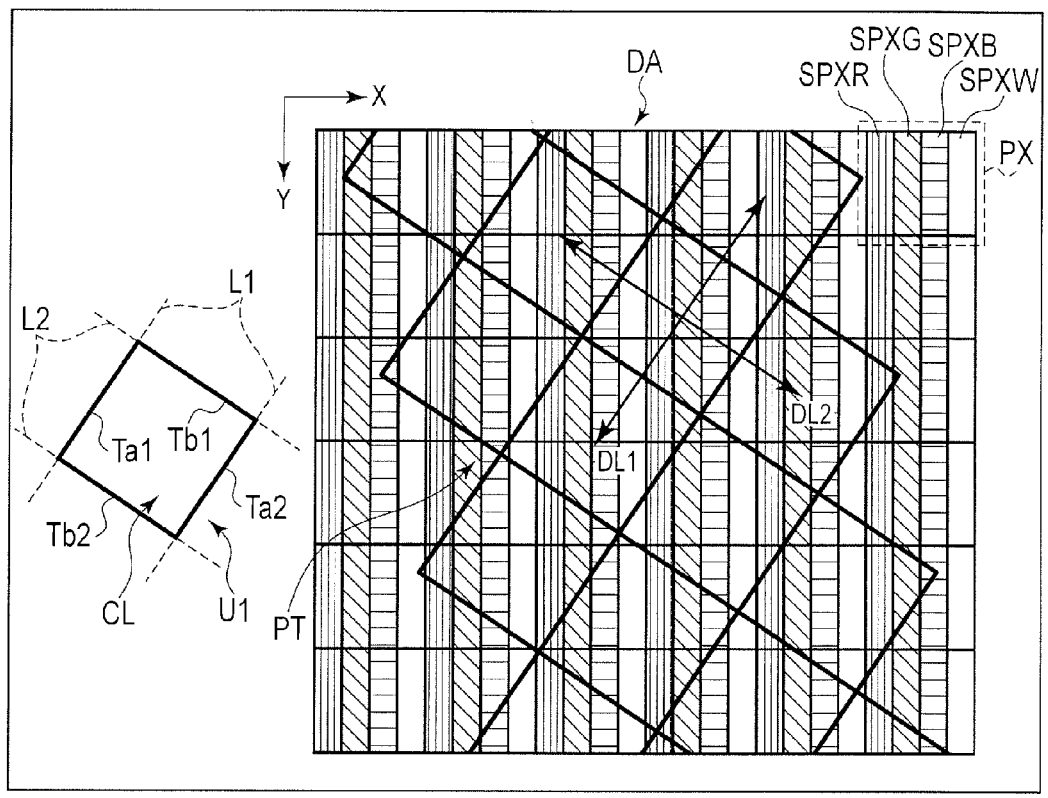
FIG. 16 is a view which schematically shows part of electrode pattern of example 1.

FIG. 16 schematically shows a part of the electrode pattern PT of example 1. In the Figure, not only the electrode pattern PT but also the display area DA of the liquid crystal display panel PNL on which detection electrodes Rx including the electrode pattern PT are depicted. Within the display area DA, pixels PX each including red subpixel SPXR, green subpixel SPXG, blue subpixel SPXB, and white subpixel SPXW are arranged in a matrix extending in both directions X and Y.

A unit pattern U1 is shown at the left of FIG. 16. The electrode pattern PT of this example is a set of unit patterns U1 arranged along extending direction DL1 of the first lines L1 of the grid GRD and along extending direction DL2 of the second lines L2 of the grid GRD. Unit pattern U1 is a pattern composed of a cell CL defined by consecutive two first lines L1 and consecutive two second lines L2 in which line fragments Ta1 and Ta2 are disposed at two sides facing each other and line fragments Tb1 and Tb2 are disposed at the other two sides facing each other. That is, unit pattern U1 is closed by the line fragments T. In the example depicted, the first lines L1 and the second lines L2 are orthogonal to each other and pitch P1 and pitch P2 are equal. Therefore, unit pattern U1 is a square.

In this electrode pattern PT, the outlines of two adjacent unit patterns U1 are formed to share one line fragment T. For example, in the two unit patterns U1 arranged consecutively in extending direction DL1 of the first lines L1, the outlines of these two unit patterns U1 are formed such that one line fragment Tb disposed at their boundary is used as line fragment Tb1 in one unit pattern U1 and is also used as line fragment Tb2 in the other unit pattern U1.

EXAMPLE 2

Figure 17:
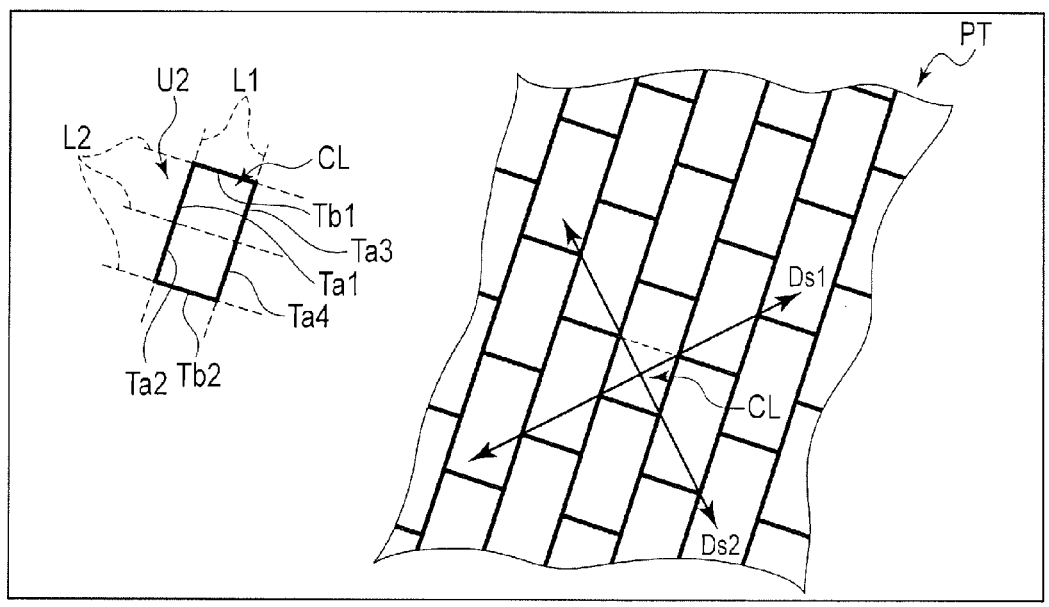
FIG. 17 is a view which schematically shows part of electrode pattern of example 2.

FIG. 17 schematically shows a part of the electrode pattern PT of example 2. A unit pattern U2 is shown at the left of FIG. 17. The electrode pattern PT of this example is a set of unit patterns U2 arranged along the diagonal line direction (arrangement direction Ds1) of cells CL in the grid GRD and along the other diagonal line direction (arrangement direction Ds2) of cells CL in the grid GRD.

Unit pattern U2 is a pattern composed of two cells CL defined by consecutive two first lines L1 and consecutive three second lines L2 in which line fragments Ta1, Ta2, Ta3, Ta4, Tb1, and Tb2 are disposed at six sides of these cells CL excluding the side of the boundary therebetween. That is, unit pattern U2 is closed by the line fragments T. In the example depicted, the first lines L1 and the second lines L2 are orthogonal to each other and pitch P1 and pitch P2 are equal. Therefore, unit pattern U2 is a rectangle whose long side is twice its short side.

In this electrode pattern PT, the outlines of two adjacent unit patterns U2 are formed to share one line fragment T. For example, in the two unit patterns U2 arranged consecutively in arrangement direction Ds1, the outlines of these two unit patterns U2 are formed such that one line fragment Ta disposed at their boundary is used as line fragment Ta2 in one unit pattern U2 and is also used as line fragment Ta3 in the other unit pattern U2.

EXAMPLE 3

Figure 18:
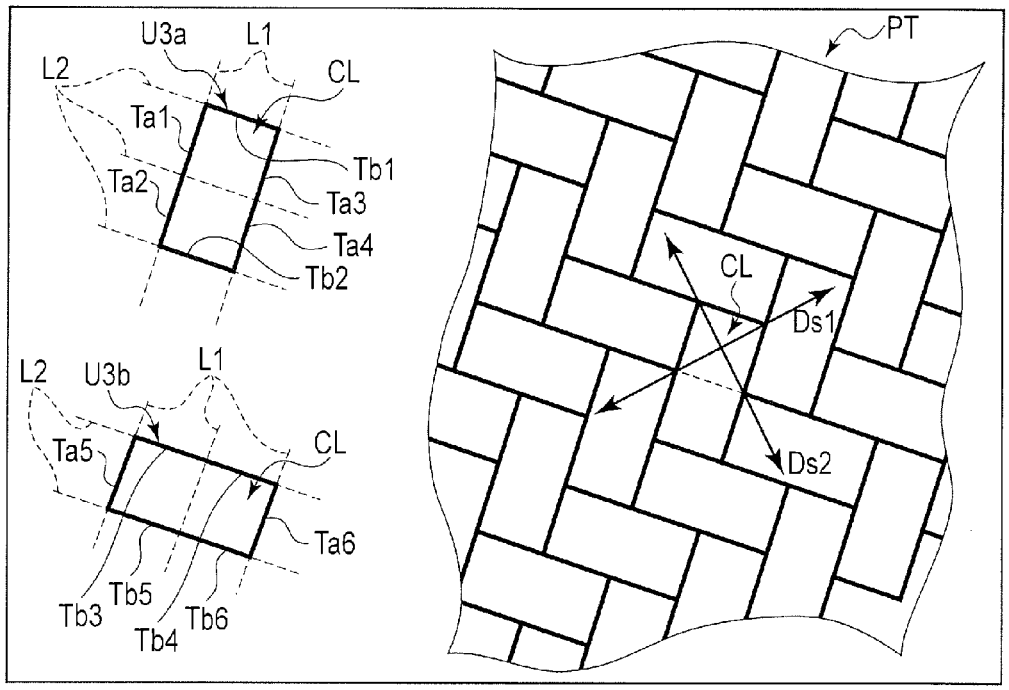
FIG. 18 is a view which schematically shows part of electrode pattern of example 3.

FIG. 18 schematically shows a part of the electrode pattern PT of example 3. Unit patterns U3*a* and U3*b* are shown at the left of FIG. 18. The electrode pattern PT of this example is a combination of unit patterns U3*a* and U3*b*. Specifically, the electrode pattern PT is a combination of a plurality of unit patterns U3*a* arranged along the diagonal line direction (arrangement direction Ds1) of cells CL in the grid GRD and a plurality of unit patterns U3*b* arranged along the same diagonal line direction, those are arranged alternately in the other diagonal line direction (arrangement direction Ds2) of the cells CL.

Unit pattern U3*a* is a pattern composed of two cells CL defined by consecutive two first lines L1 and consecutive three second lines L2 in which line fragments Ta1, Ta2, Ta3, Ta4, Tb1, and Tb2 are disposed at six sides of these cells CL excluding the side of the boundary therebetween. Unit pattern U3*b* is a pattern composed of two cells CL defined by consecutive three first lines L1 and consecutive two second lines L2 in which line fragments Ta5, Ta6, Tb3, Tb4, Tb5, and Tb6 are disposed at six sides of these cells CL excluding the side of the boundary therebetween. That is, unit patterns U3*a* and U3*b* are closed by the line fragments T. In the example depicted, the first lines L1 and the second lines L2 are orthogonal to each other and pitch P1 and pitch P2 are equal. Therefore, each of unit patterns U3*a* and U3*b* is a rectangle whose long side is twice its short side.

In this electrode pattern PT, the outlines of two adjacent unit patterns U3*a*, the outlines of two adjacent unit patterns U3*b*, and the outlines of adjacent unit patterns U3*a* and U3*b* are formed to share one line fragment T. For example, in the two unit patterns U3*a* arranged consecutively in arrangement direction Ds1, the outlines of these two unit patterns U3*a* are formed such that one line fragment Ta disposed at their boundary is used as line fragment Ta2 in one unit pattern U3*a* and is also used as line fragment Ta3 in the other unit pattern U3*a*.

Furthermore, for example, in the two unit patterns U3*b* arranged consecutively in arrangement direction Ds1, the outlines of these two unit patterns U3*b* are formed such that one line fragment Tb disposed at their boundary is used as line fragment Tb4 in one unit pattern U3*b* and is also used as line fragment Tb5 in the other unit pattern U3*b*.

One unit pattern U3*a* is adjacent to four unit patterns U3*b*. The outline of this unit pattern U3*a* is formed such that its line fragments Ta1, Ta4, Tb1, and Tb2 are shared with the outlines of the four unit patterns U3*b*.

Furthermore, one unit pattern U3*b* is adjacent to four unit patterns U3*a*. The outline of this unit pattern U3*b* is formed such that its line fragments Ta5, Ta6, Tb3, and Tb6 are shared with the outlines of the four unit patterns U3*a*.

EXAMPLE 4

Figure 19:
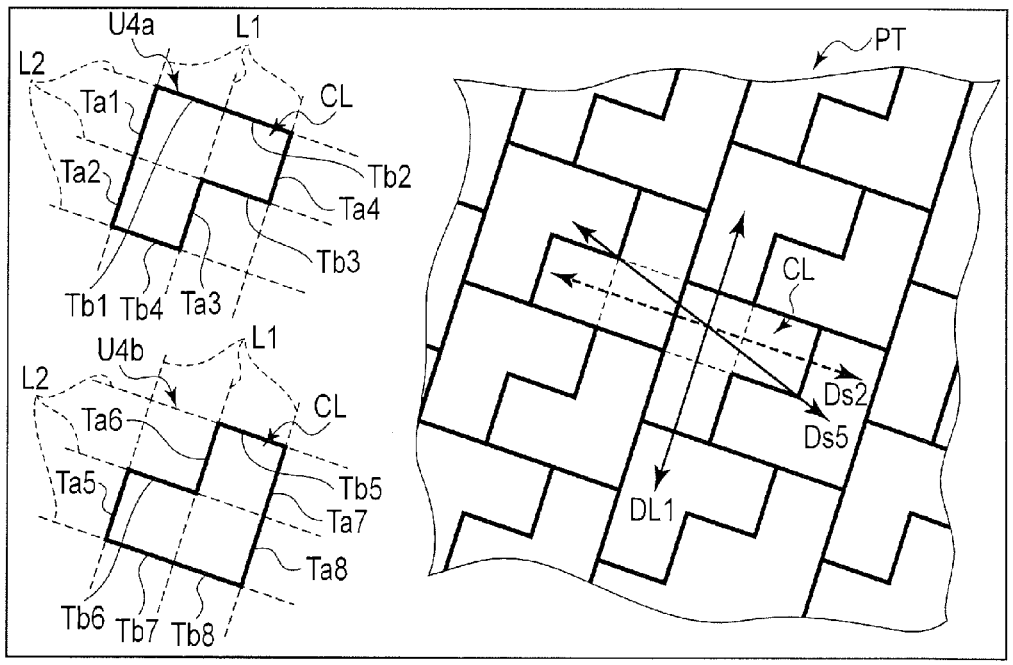
FIG. 19 is a view which schematically shows part of electrode pattern of example 4.

FIG. 19 schematically shows a part of the electrode pattern PT of example 4. Unit patterns U4*a* and U4*b* are shown at the left of FIG. 19. The electrode pattern PT of this example is a combination of unit patterns U4*a* and U4*b*. Specifically, the electrode pattern PT is a combination of a plurality of unit patterns U4*a* arranged along extending direction DL1 of the first lines L1 of the grid GRD and a plurality of unit patterns U4*b* arranged along the same extending direction DL1, those are arranged alternately along diagonal line direction Ds5 of a rectangle composed of three cells CL consecutive in extending direction DL2 of the second lines L2.

Unit pattern U4*a* is a pattern composed of three out of four cells CL defined by consecutive three first lines L1 and consecutive three second lines L2 in which line fragments Ta1, Ta2, Ta3, Ta4, Tb1, Tb2, Tb3, and Tb4 are disposed at eight sides of these cells CL excluding the sides of the boundaries therein. Unit pattern U4*b* is a pattern composed of three out of four cells CL defined by consecutive three first lines L1 and consecutive three second lines L2 in which line fragments Ta5, Ta6, Ta7, Ta8, Tb5, Tb6, Tb7, and Tb8 are disposed at eight sides of these cells CL excluding the sides of the boundaries therein. That is, unit patterns U4*a* and U4*b* are closed by the line fragments T. In the example depicted, the first lines L1 and the second lines L2 are orthogonal to each other and pitch P1 and pitch P2 are equal. Therefore, each of unit patterns U4*a* and U4*b* is formed in a right-angled L-shape.

In this electrode pattern PT, the outlines of two adjacent unit patterns U4*a*, the outlines of two adjacent unit patterns U4*b*, and the outlines of adjacent unit patterns U4*a* and U4*b* are formed to share at least one line fragment T. For example, in the two unit patterns U4*a* arranged consecutively in extending direction DL1 of first lines L1, the outlines of these two unit patterns U4*a* are formed such that one line fragment Tb disposed at their boundary is used as line fragment Tb1 in one unit pattern U4*a* and is also used as line fragment Tb4 in the other unit pattern U4*a*.

Furthermore, for example, in the two unit patterns U4*b* arranged consecutively in extending direction DL1 of first lines L1, the outlines of these two unit patterns U4*b* are formed such that one line fragment Tb disposed at their boundary is used as line fragment Tb5 in one unit pattern U4*b* and is used as line fragment Tb8 in the other unit pattern U4*b*.

One unit pattern U4*a* is adjacent to four unit patterns U4*b*. The outline of this unit pattern U4*a* is formed such that its line fragments Ta1, Ta2, Ta3, Ta4, Tb2, and Tb3 are shared with the outlines of the four unit patterns U4*b*.

Furthermore, one unit pattern U4*b* is adjacent to four unit patterns U4*a*. The outline of this unit pattern U4*b* is formed such that its line fragments Ta5, Ta6, Ta7, Ta8, Tb6, and Tb7 are shared with the outlines of the four unit patterns U4*a*.

EXAMPLE 5

FIG. 20 schematically shows a part of the electrode pattern PT of example 5. A unit pattern U5 is shown at the left of FIG. 20. The electrode pattern PT of this example is a set of unit patterns U5 arranged along extending direction DL1 of the first lines L1 and the diagonal line direction Ds5 of a rectangle composed of three cells CL consecutive in extending direction DL2 of the second lines L2.

Unit pattern U5 is a pattern composed of six out of a plurality of cells CL defined by consecutive five first lines L1 and consecutive four second lines L2 in which line fragments Ta1, Ta2, Ta3, Ta4, Ta5, Ta6, Tb1, Tb2, Tb3, Tb4, Tb5, Tb6, Tb7, and Tb8 are disposed at fourteen sides of these cells CL excluding the sides of the boundaries therein. That is, unit pattern U5 is closed by the line fragments T. In the example depicted, the first lines L1 and the second lines L2 are orthogonal to each other and pitch P1 and pitch P2 are equal. Therefore, unit pattern U5 is formed as two right-angled L-shapes connected to each other at their bending portions with one turned upside down.

In this electrode pattern PT, the outlines of two adjacent unit patterns U5 are formed to share at least one line fragment T. For example, in the two unit patterns U5 arranged consecutively in extending direction DL1 of first lines L1, the outlines of these two unit patterns U5 are formed such that one line fragment Ta and two line fragments Tb disposed at their boundary are used as line fragments Ta3, Tb1, and Tb3 in one unit pattern U5 and are also used as line fragments Ta4, Tb6, and Tb8 in the other unit pattern U5.

EXAMPLE 6

FIG. 21 schematically shows a part of the electrode pattern PT of example 6. The electrode pattern PT of this example is a set of zigzag detection lines W extended along the diagonal line direction (arrangement direction Ds2) of cells CL in the grid GRD and arranged along the other diagonal line direction (arrangement direction Ds1) of cells CL at certain intervals. A unit pattern U6 is shown at the left of FIG. 21 and the detection line W is a set of unit patterns U6 connected to each other at their ends and arranged along arrangement direction Ds2.

Unit pattern U6 is a pattern composed of two line fragments Ta and Tb arranged at adjacent two sides in a cell defined by consecutive two first lines L1 and consecutive two second lines L2. In the example depicted, the first lines L1 and the second lines L2 are orthogonal to each other and pitch P1 and pitch P2 are equal. Therefore, unit pattern U6 is formed in a right-angled L-shape.

EXAMPLE 7

Figure 22:
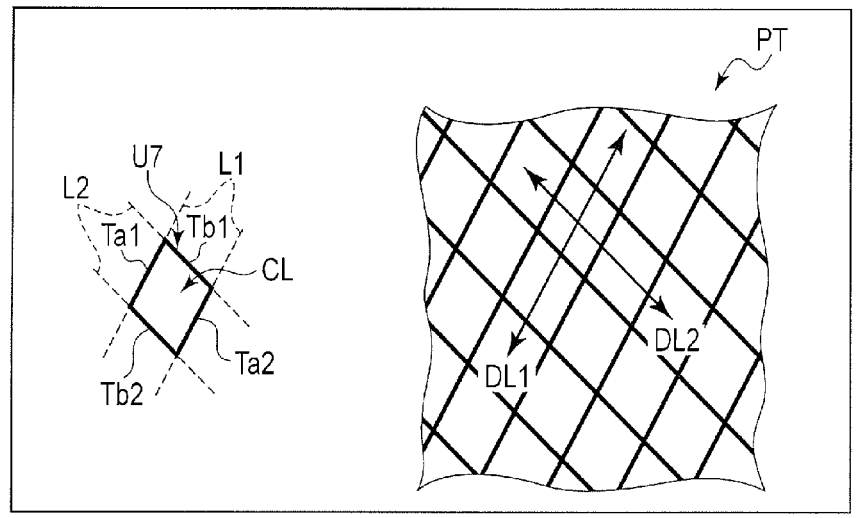
FIG. 22 is a view which schematically shows part of electrode pattern of example 7.

FIG. 22 schematically shows a part of the electrode pattern PT of example 7. A unit pattern U7 is shown at the left of FIG. 22. The electrode pattern PT of this example is a set of unit patterns U7 arranged along extending direction DL1 of the first lines L1 of the grid GRD and extending direction DL2 of the second lines L2 of the grid GRD. Unit pattern U7 is a pattern composed of a cell CL defined by consecutive two first lines L1 and consecutive two second lines L2 in which line fragments Ta1 and Ta2 are disposed at two sides facing each other and line fragments Tb1 and Tb2 are disposed at the other two sides facing each other. That is, unit pattern U7 is closed by the line fragments T. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, unit pattern U7 is a rhombus.

In this electrode pattern PT, the outlines of two adjacent unit patterns U7 are formed to share a single line fragment T. For example, in the two unit patterns U7 arranged consecutively in extending direction DL1 of the first lines L1, the outlines of these two unit patterns U7 are formed such that one line fragment Tb disposed at their boundary is used as line fragment Tb1 in one unit pattern U7 and is also used as line fragment Tb2 in the other unit pattern U7.

EXAMPLE 8

Figure 23:
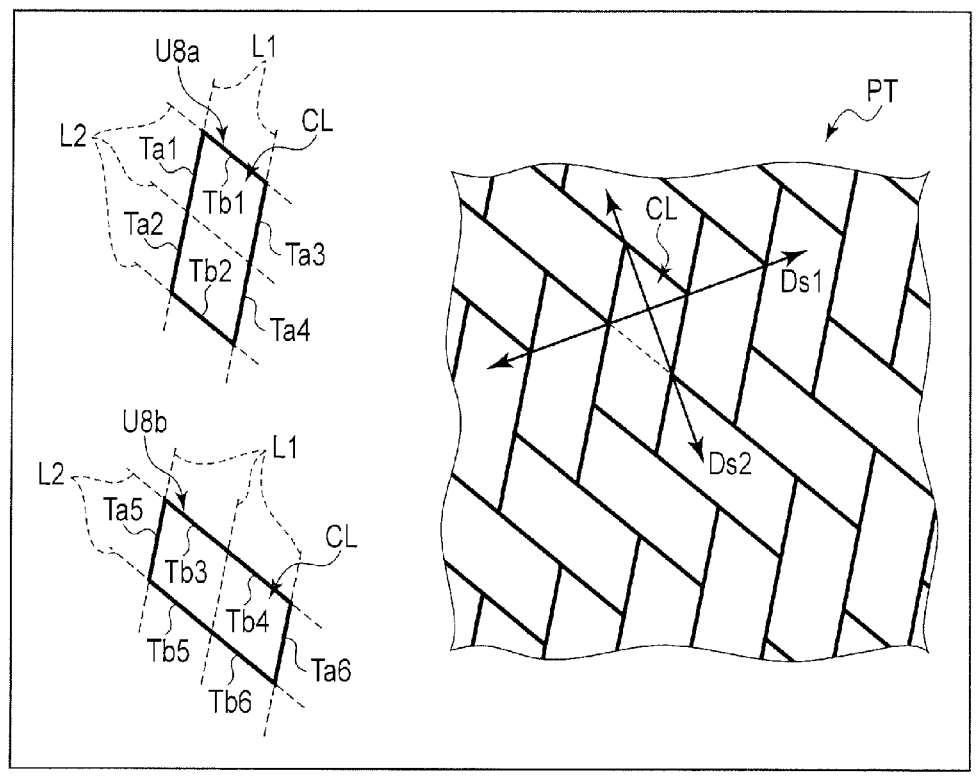
FIG. 23 is a view which schematically shows part of electrode pattern of example 8.

FIG. 23 schematically shows a part of the electrode pattern PT of example 8. Unit patterns U8*a* and U8*b* are shown at the left of FIG. 23. The electrode pattern PT of this example is a combination of unit patterns U8*a* and U8*b*. Specifically, the electrode pattern PT is a combination of a plurality of unit patterns U8*a* arranged along the diagonal line direction (arrangement direction Ds1) of cells CL in the grid GRD and a plurality of unit patterns U8*b* arranged along the same diagonal line direction, those are arranged alternately in the other diagonal line direction (arrangement direction Ds2) of cells CL.

Unit pattern U8*a* is a pattern composed of two cells CL defined by consecutive two first lines L1 and consecutive three second lines L2 in which line fragments Ta1, Ta2, Ta3, Ta4, Tb1, and Tb2 are disposed at six sides of these cells CL excluding the sides of the boundary therebetween. Unit pattern U8*b* is a pattern composed of two cells CL defined by consecutive three first lines L1 and consecutive two second lines L2 in which line fragments Ta5, Ta6, Tb3, Tb4, Tb5, and Tb6 are disposed at six sides of these cells CL excluding the sides of the boundary therebetween. That is, unit patterns U8*a* and U8*b* are closed by the line fragments T. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, each of unit patterns U8a and U8b is a parallelogram whose long side is twice its short side.

In this electrode pattern PT, the outlines of two adjacent unit patterns U8a, the outlines of two adjacent unit patterns U8b, and the outlines of adjacent unit patterns U8a and U8b are formed to share one line fragment T. For example, in the two unit patterns U8a arranged consecutively in arrangement direction Ds1, the outlines of these two unit patterns U8a are formed such that one line fragment Ta disposed at their boundary is used as line fragment Ta2 in one unit pattern U8a and is used as line fragment Ta3 in the other unit pattern U8a.

Furthermore, for example, in the two unit patterns U8b arranged consecutively in arrangement direction Ds1, the outlines of these two unit patterns U8b are formed such that one line fragment Tb disposed at their boundary is used as line fragment Tb4 in one unit pattern U8b and is also used as line fragment Tb5 in the other unit pattern U8b.

One unit pattern U8a is adjacent to four unit patterns U8b. The outline of this unit pattern U8a is formed such that its line fragments Ta1, Ta4, Tb1, and Tb2 are shared with the outlines of the four unit patterns U8b.

Furthermore, one unit pattern U8b is adjacent to four unit patterns U8a. The outline of this unit pattern U8b is formed such that its line fragments Ta5, Ta6, Tb3, and Tb6 are shared with the outlines of the four unit patterns U8a.

EXAMPLE 9

Figure 24:
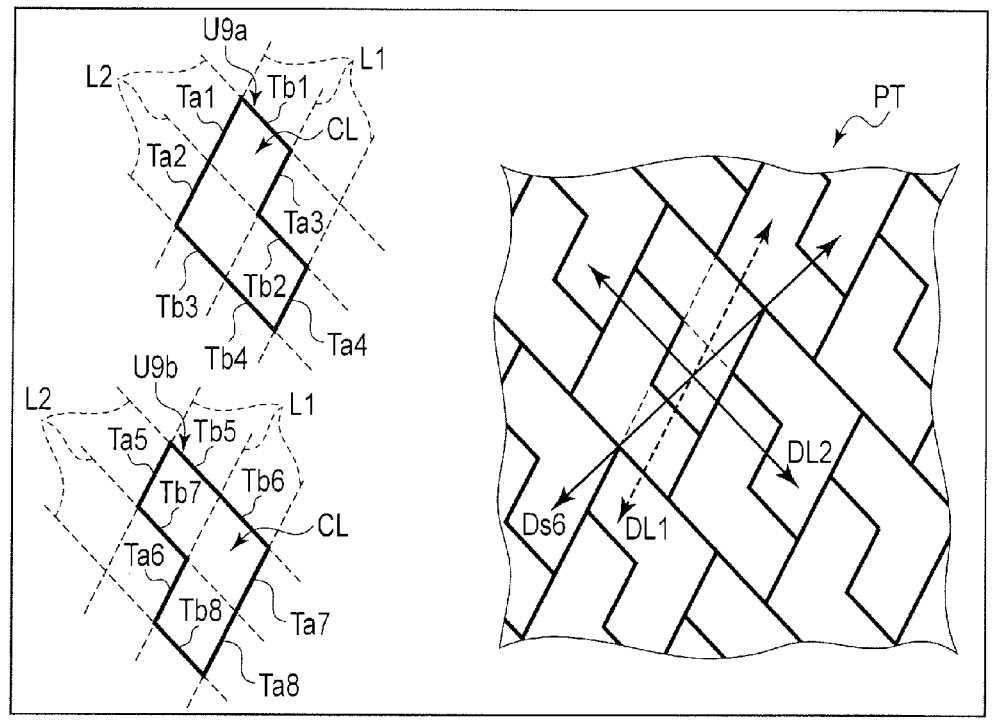
FIG. 24 is a view which schematically shows part of electrode pattern of example 9.

FIG. 24 schematically shows a part of the electrode pattern PT of example 9. Unit patterns U9a and U9b are shown at the left of FIG. 24. The electrode pattern PT of this example is a combination of unit patterns U9a and U9b. Specifically, the electrode pattern PT is a combination of a plurality of unit patterns U9a arranged along extending direction DL2 of the second lines L2 of the grid GRD and a plurality of unit patterns U9b arranged along the same extending direction DL2, those are arranged alternately along diagonal line direction Ds6 of a quadrangle composed of three cells CL consecutive in extending direction DL1 of the first lines L1.

Unit pattern U9a is a pattern composed of three out of four cells CL defined by consecutive three first lines L1 and consecutive three second lines L2 in which line fragments Ta1, Ta2, Ta3, Ta4, Tb1, Tb2, Tb3, and Tb4 are disposed at eight sides of these cells CL excluding the sides of the boundaries therein. Unit pattern U9b is a pattern composed of three out of four cells CL defined by consecutive three first lines L1 and consecutive three second lines L2 in which line fragments Ta5, Ta6, Ta7, Ta8, Tb5, Tb6, Tb7, and Tb8 are disposed at eight sides of these cells CL excluding the sides of the boundaries therein. That is, unit patterns U9a and U9b are closed by the line fragments T. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, each of unit patterns U9a and U9b is an obtuse-angled V-shape.

In this electrode pattern PT, the outlines of two adjacent unit patterns U9a, the outlines of two adjacent unit patterns U9b, and the outlines of adjacent unit patterns U9a and U9b are formed to share at least one line fragment T. For example, in the two unit patterns U9a arranged consecutively in extending direction DL2 of second lines L2, the outlines of these two unit patterns U9a are formed such that one line fragment Ta disposed at their boundary is used as line fragment Ta2 in one unit pattern U9a and is also used as line fragment Ta4 in the other unit pattern U9a.

Furthermore, for example, in the two unit patterns U9b arranged consecutively in extending direction DL2 of second lines L2, the outlines of these two unit patterns U9b are formed such that one line fragment Ta disposed at their boundary is used as line fragment Ta5 in one unit pattern U9b and is used as line fragment Ta7 in the other unit pattern U9b.

One unit pattern U9a is adjacent to four unit patterns U9b. The outline of this unit pattern U9a is formed such that its line fragments Ta1, Ta3, Tb1, Tb2, Tb3, and Tb4 are shared with the outlines of the four unit patterns U9b.

Furthermore, one unit pattern U9b is adjacent to four unit patterns U9a. The outline of this unit pattern U9b is formed such that its line fragments Ta6, Ta8, Tb5, Tb6, Tb7, and Tb8 are shared with the outlines of the four unit patterns U9a.

EXAMPLE 10

Figure 25:
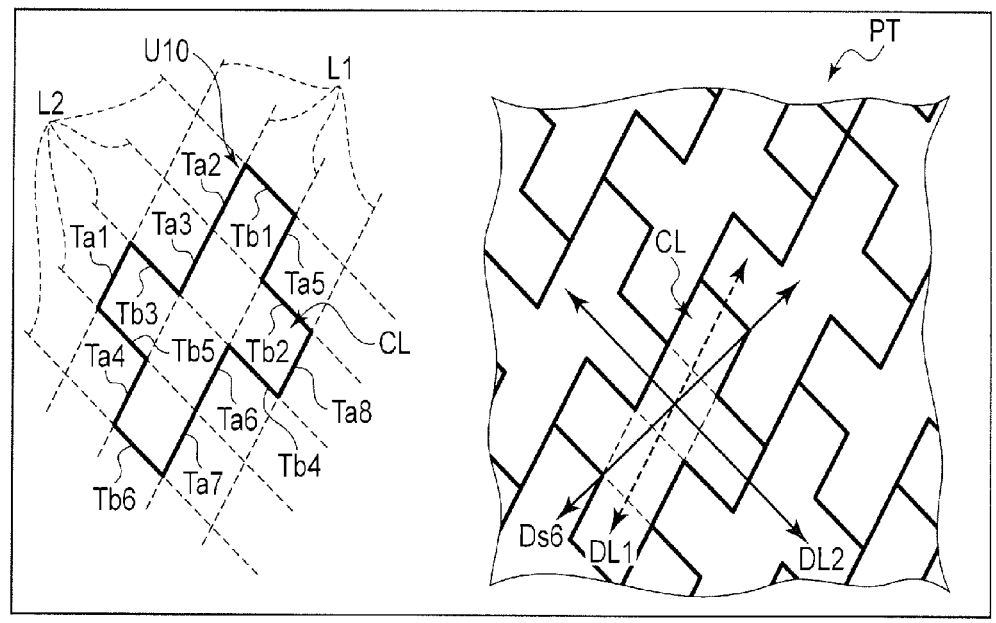
FIG. 25 is a view which schematically shows part of electrode pattern of example 10.

FIG. 25 schematically shows a part of the electrode pattern PT of example 10. Unit pattern U10 is shown at the left of FIG. 25. The electrode pattern PT of this example is a set of unit patterns U10 arranged along extending direction DL2 of the second lines L2 and the diagonal line direction Ds6 of a quadrangle composed of three cells CL consecutive in extending direction DL1 of the first lines L1.

Unit pattern U10 is a pattern composed of six out of a plurality of cells CL defined by consecutive four first lines L1 and consecutive five second lines L2 in which line fragments Ta1, Ta2, Ta3, Ta4, Ta5, Ta6, Ta7, Ta8, Tb1, Tb2, Tb3, Tb4, Tb5, and Tb6 are disposed at fourteen sides of these cells CL excluding the sides of the boundaries therein. That is, unit patterns U10 is closed by the line fragments T. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, unit pattern U10 is formed as two obtuse-angled (or acute-angled) V-shapes connected to each other at their bending portions with one twisted laterally and turned upside down.

In this electrode pattern PT, the outlines of two adjacent unit patterns U10 are formed to share at least one line fragment T. For example, in the two unit patterns U10 arranged consecutively in extending direction DL2 of second lines L2, the outlines of these two unit patterns U10 are formed such that two line fragments Ta and one line fragment Tb disposed at their boundary are used as line fragments Ta1, Ta3, and Tb3 in the one unit pattern U10 and are also used as line fragments Ta6, Ta8, and Tb4 in the other unit pattern U10.

EXAMPLE 11

FIG. 26 schematically shows a part of the electrode pattern PT of example 11. Unit pattern U11 is shown at the left of FIG. 26. The electrode pattern PT of this example is a set of unit patterns U11 arranged along the diagonal line direction (arrangement direction Ds2) of the cells CL in the grid GRD and the diagonal line direction Ds7 of a quadrangle composed of two cells CL consecutive in extending direction DL1 of the first lines L1.

Unit pattern U11 is a pattern composed of three out of four cells CL defined by consecutive three first lines L1 and consecutive three second lines L2 in which line fragments Ta1, Ta2, Ta3, Ta4, Tb1, Tb2, Tb3, and Tb4 are disposed at eight sides of these cells CL excluding the sides of the boundaries therein. That is, unit pattern U11 is closed by the line fragments T. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, unit pattern U11 is an acute-angled V-shape.

In this electrode pattern PT, the outlines of two adjacent unit patterns U11 are formed to share at least one line fragment T. For example, in the two unit patterns U11 arranged consecutively in arrangement direction Ds2, the outlines of these two unit patterns U11 are formed such that one line fragment Ta and one line fragment Tb disposed at their boundary are used as line fragments Ta2 and Tb2 in one unit pattern U11 and are also used as line fragments Ta4 and Tb4 in the other unit pattern U11.

EXAMPLE 12

FIG. 27 schematically shows a part of the electrode pattern PT of example 12. Unit patterns U12a and U12b are shown at the left of FIG. 27. The electrode pattern PT of this example is a combination of unit patterns U12a and U12b. Specifically, the electrode pattern PT is a combination of a plurality of unit patterns U12a arranged along the diagonal line direction (arrangement direction Ds1) of the cells CL in the grid GRD and a plurality of unit patterns U12b arranged along the same diagonal line direction, those are arranged alternately along the other diagonal line direction (arrangement direction Ds2) of the cells CL.

Unit pattern U12a is a pattern composed of three out of four cells CL defined by consecutive three first lines L1 and consecutive three second lines L2 in which line fragments Ta1, Ta2, Ta3, Ta4, Tb1, Tb2, Tb3, and Tb4 are disposed at eight sides of these cells CL excluding the sides of the boundaries therein. Unit pattern U12b is a pattern composed of three out of four cells CL defined by consecutive three first lines L1 and consecutive three second lines L2 in which line fragments Ta5, Ta6, Ta7, Ta8, Tb5, Tb6, Tb7, and Tb8 are disposed at eight sides of these cells CL excluding the sides of the boundaries therein. That is, unit patterns U12a and U12b are closed by the line fragments T. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, each of unit patterns U12a and U12b is formed in an acute-angled V-shape.

In this electrode pattern PT, the outlines of two adjacent unit patterns U12a, the outlines of two adjacent unit patterns U12b, and the outlines of adjacent unit patterns U12a and U12b are formed to share at least one line fragment T. For example, in the two unit patterns U12a arranged consecutively in arrangement direction Ds2, the outlines of these two unit patterns U12a are formed such that one line fragment Ta and one line fragment Tb disposed at their boundary are used as line fragments Ta2 and Tb2 in one unit pattern U12a and are also used as line fragments Ta4 and Tb4 in the other unit pattern U12a.

Furthermore, for example, in the two unit patterns U12b arranged consecutively in arrangement direction Ds2, the outlines of these two unit patterns U12b are formed such that one line fragment Ta and one line fragment Tb disposed at their boundary are used as line fragments Ta5 and Tb5 in one unit pattern U12b and are used as line fragments Ta7 and Tb7 in the other unit pattern U12b.

One unit pattern U12a is adjacent to four unit patterns U12b. The outline of this unit pattern U12a is formed such that its line fragments Ta1, Ta3, Tb1, and Tb3 are shared with the outlines of the four unit patterns U12b.

Furthermore, one unit pattern U12b is adjacent to four unit patterns U12a. The outline of this unit pattern U12b is formed such that its line fragments Ta6, Ta8, Tb6, and Tb8 are shared with the outlines of the four unit patterns U12a.

EXAMPLE 13

Figure 28:
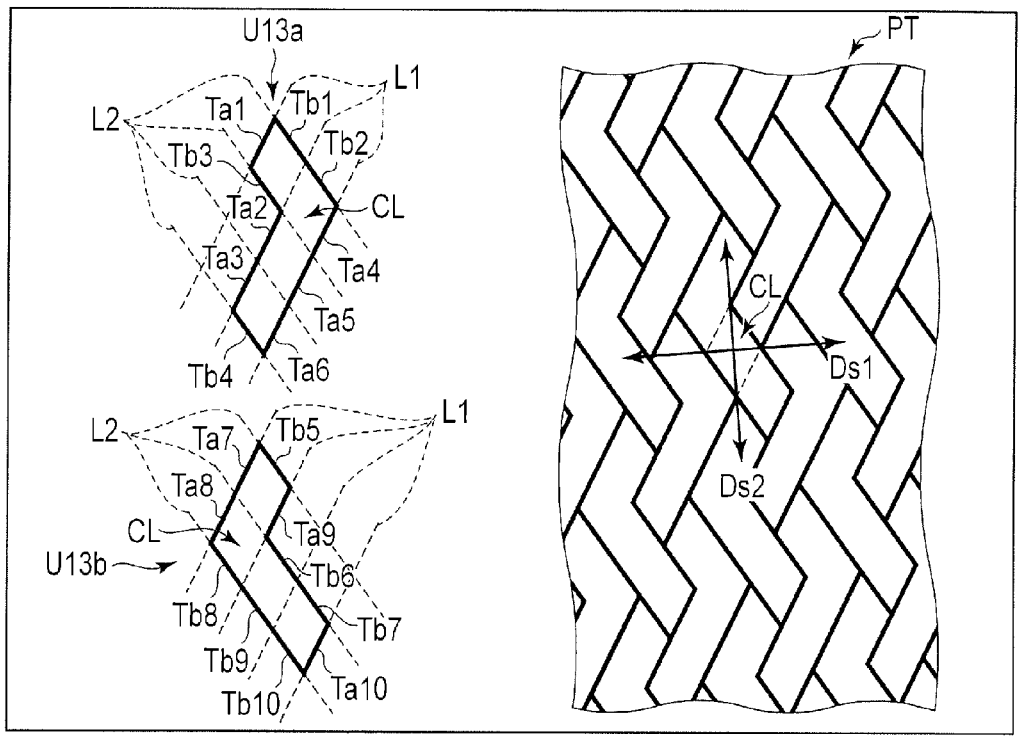
FIG. 28 is a view which schematically shows part of electrode pattern of example 13.

FIG. 28 schematically shows a part of the electrode pattern PT of example 13. Unit patterns U13a and U13b are shown at the left of FIG. 28. The electrode pattern PT of this example is a combination of unit patterns U13a and U13b. Specifically, the electrode pattern PT is a combination of a plurality of unit patterns U13a arranged along the diagonal line direction (arrangement direction Ds2) of the cells CL in the grid GRD and a plurality of unit patterns U13b arranged along the same diagonal line direction, those are arranged alternately along the other diagonal line direction (arrangement direction Ds1) of the cells CL.

Unit pattern U13a is a pattern composed of four out of six cells CL defined by consecutive three first lines L1 and consecutive four second lines L2 in which line fragments Ta1, Ta2, Ta3, Ta4, Ta5, Ta6, Tb1, Tb2, Tb3, and Tb4 are disposed at ten sides of these cells CL excluding the sides of the boundaries therein. Unit pattern U13b is a pattern composed of four out of six cells CL defined by consecutive four first lines L1 and consecutive three second lines L2 in which line fragments Ta7, Ta8, Ta9, Ta10, Tb5, Tb6, Tb7, Tb8, Tb9, and Tb10 are disposed at ten sides of these cells CL excluding the sides of the boundaries therein. That is, unit patterns U13a and U13b are closed by the line fragments T. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, each of unit patterns U13a and U13b is formed in an obtuse-angled L-shape.

In this electrode pattern PT, the outlines of two adjacent unit patterns U13a, the outlines of two adjacent unit patterns U13b, and the outlines of adjacent unit patterns U13a and U13b are formed to share at least one line fragment T. For example, in the two unit patterns U13a arranged consecutively in arrangement direction Ds2, the outlines of these two unit patterns U13a are formed such that one line fragment Ta disposed at their boundary is used as line fragment Ta1 in one unit pattern U13a and is also used as line fragment Ta6 in the other unit pattern U13a.

Furthermore, for example, in the two unit patterns U13b arranged consecutively in arrangement direction Ds2, the outlines of these two unit patterns U13b are formed such that one line fragment Tb disposed at their boundary is used as line fragment Tb5 in one unit pattern U13b and is used as line fragment Tb10 in the other unit pattern U13b.

One unit pattern U13a is adjacent to four unit patterns U13b. The outline of this unit pattern U13a is formed such that its line fragments Ta2, Ta3, Ta4, Ta5, Tb1, Tb2, Tb3, and Tb4 are shared with the outlines of the four unit patterns U13b.

Furthermore, one unit pattern U13b is adjacent to four unit patterns U13a. The outline of this unit pattern U13b is formed such that its line fragments Ta7, Ta8, Ta9, Ta10, Tb6, Tb7, Tb8, and Tb9 are shared with the outlines of the four unit patterns U13a.

EXAMPLE 14

Figure 29:
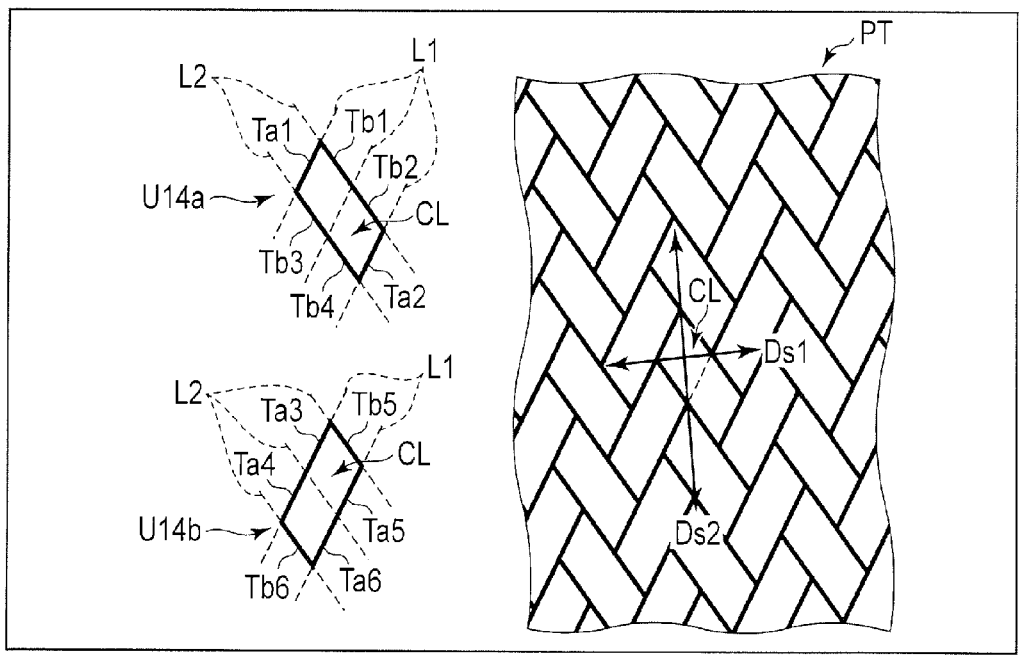
FIG. 29 is a view which schematically shows part of electrode pattern of example 14.

FIG. 29 schematically shows a part of the electrode pattern PT of example 14. Unit patterns U14*a* and U14*b* are shown at the left of FIG. 29. The electrode pattern PT of this example is a combination of unit patterns U14*a* and U14*b*. Specifically, the electrode pattern PT is a combination of a plurality of unit patterns U14*a* arranged along the diagonal line direction (arrangement direction Ds2) of cells CL in the grid GRD and a plurality of unit patterns U14*b* arranged along the same diagonal line direction, those are arranged alternately in the other diagonal line direction (arrangement direction Ds1) of the cells CL.

Unit pattern U14*a* is a pattern composed of two cells CL defined by consecutive three first lines L1 and consecutive two second lines L2 in which line fragments Ta1, Ta2, Tb1, Tb2, Tb3, and Tb4 are disposed at six sides of these cells CL excluding the side of the boundary therebetween. Unit pattern U14*b* is a pattern composed of two cells CL defined by consecutive two first lines L1 and consecutive three second lines L2 in which line fragments Ta3, Ta4, Ta5, Ta6, Tb5, and Tb6 are disposed at six sides of these cells CL excluding the side of the boundary therebetween. That is, unit patterns U14*a* and U14*b* are closed by the line fragments T. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, each of unit patterns U14*a* and U14*b* is a parallelogram whose long side is twice its short side.

In this electrode pattern PT, the outlines of two adjacent unit patterns U14*a*, the outlines of two adjacent unit patterns U14*b*, and the outlines of adjacent unit patterns U14*a* and U14*b* are formed to share at least one line fragment T. For example, in the two unit patterns U14*a* arranged consecutively in arrangement direction Ds2, the outlines of these two unit patterns U14*a* are formed such that one line fragment Tb disposed at their boundary is used as line fragment Tb1 in one unit pattern U14*a* and is also used as line fragment Tb4 in the other unit pattern U14*a*.

Furthermore, for example, in the two unit patterns U14*b* arranged consecutively in arrangement direction Ds2, the outlines of these two unit patterns U14*b* are formed such that one line fragment Ta disposed at their boundary is used as line fragment Ta3 in one unit pattern U14*b* and is used as line fragment Ta6 in the other unit pattern U14*b*.

One unit pattern U14*a* is adjacent to four unit patterns U14*b*. The outline of this unit pattern U14*a* is formed such that its line fragments Ta1, Ta2, Tb2, and Tb3 are shared with the outlines of the four unit patterns U14*b*.

Furthermore, one unit pattern U14*b* is adjacent to four unit patterns U14*a*. The outline of this unit pattern U14*b* is formed such that its line fragments Ta4, Ta5, Tb5, and Tb6 are shared with the outlines of the four unit patterns U14*a*.

EXAMPLE 15

Figure 30:
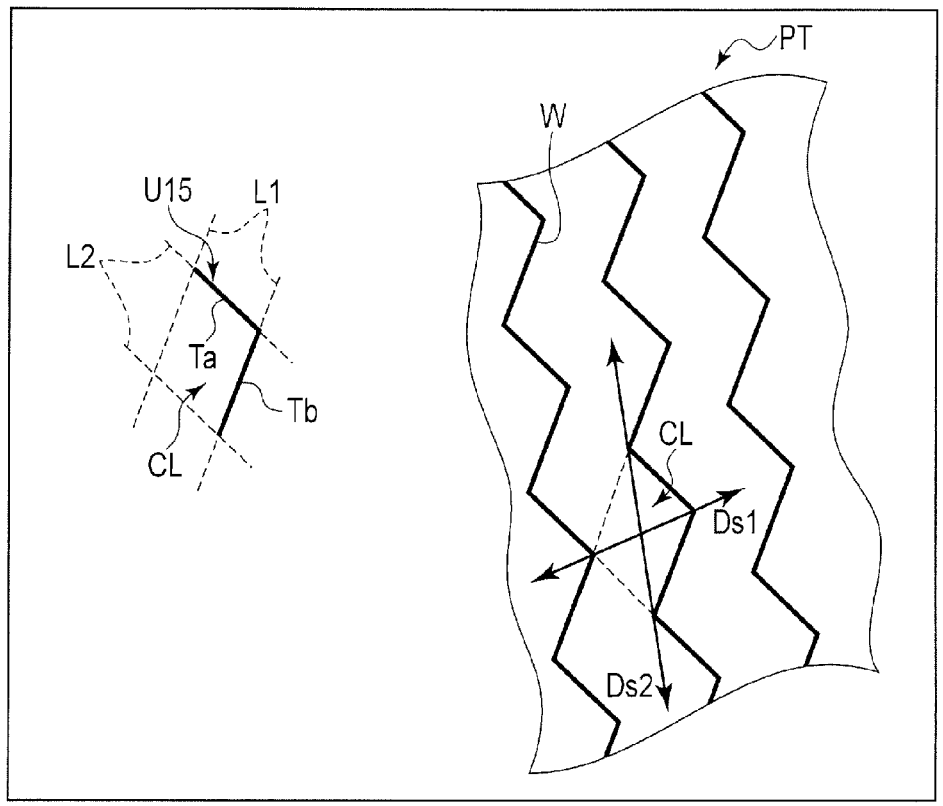
FIG. 30 is a view which schematically shows part of electrode pattern of example 15.

FIG. 30 schematically shows a part of the electrode pattern PT of example 15. The electrode pattern PT of this example is a set of zigzag detection lines W extended along the diagonal line direction (arrangement direction Ds2) of cells CL in the grid GRD and arranged along the other diagonal line direction (arrangement direction Ds1) of cells CL at certain intervals. A unit pattern U15 is shown at the left of FIG. 30 and the detection line W is a set of unit patterns U15 connected to each other at their ends and arranged along arrangement direction Ds2.

Unit pattern U15 is a pattern composed of two line fragments Ta and Tb arranged at adjacent two sides in a cell defined by consecutive two first lines L1 and consecutive two second lines L2. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, unit pattern U15 is formed in an obtuse-angled V-shape.

Other than the above-explained examples 1 to 15, various patterns including line fragments Ta and Tb arranged in the grid GRD can be adopted as the electrode pattern PT as long as those patterns satisfy the conditions 1 and 2.

The same patterns adopted in the electrode pattern PT for the detection electrodes Rx can be used in the dummy electrodes DR. In that case, the pattern of the dummy electrodes DR may be formed such that ends of line fragments are disconnected for creating the electrically floating state.

In examples 1 to 15, if the first lines L1 and the second lines L2 satisfy the condition 1, moiré caused by the interference between line fragments Ta and Tb disposed on the first lines L1 and the second line L2 and the display area DA can be prevented or reduced. Furthermore, in examples 1 to 15, if arrangement directions Ds1 and Ds2 at each crossing point of the first lines L1 and second lines L2 in the grid GRD satisfy the condition 2, moiré caused by the interference between the joints of the line fragments Ta and Tb disposed at the intersections and the display area DA. Therefore, the present embodiment can provide a liquid crystal display device DSP which can prevent or reduce moiré.

Furthermore, in the present embodiment, detection electrodes Rx and sensor driving electrode (common electrode CE) of the sensor SE are disposed in different layers with a dielectric intervening therebetween. If the detection electrodes Rx and the sensor driving electrode are disposed on the same layer, electric corrosion may occur between the detection electrodes Rx and the sensor diving electrode. The present embodiment can prevent such electric corrosion.

Furthermore, in the present embodiment, if the common electrode CE disposed inside the liquid crystal display panel PNL is used for both the display electrode and the sensor driving electrode as in the mutual-capacitive sensing method, there is no need to prepare an additional sensor driving electrode for sensing purpose only in the liquid crystal display device DSP. If there is such a sensor driving electrode for sensing purpose only, moiré may occur by the interference between this sensor driving electrode and the detection electrodes Rx or the display area DA. In contrast, such moiré can be prevented in the present embodiment. Furthermore, in the present embodiment, since the common electrode CE is formed of a transparent conductive material, moiré caused by the interference between the common electrode CE and the display area DA or the detection electrodes Rx can be prevented or reduced.

Furthermore, as in examples 1 to 5 and 7 to 14, if the electrode pattern PT is composed of unit patterns closed by line fragments T and adjacent unit patterns share at least one line fragment T, a breakdown in detection electrodes Rx does not occur easily. This is because, in these unit patterns, even if a breakdown occurs in one part of the adjacent unit patterns, an electrical connection between the line fragments T next to this breakdown part can be rerouted and maintained. Therefore, the reliability of the liquid crystal display device DSP can be improved if examples 1 to 5 and 7 to 14 are adopted.

Thin fragments T are disposed at every crossing point within the grid GRD in examples 1 and 7 whereas line fragments T are reduced suitably in examples 2 to 5 and 8 to 14. If examples 2 to 5 and 8 to 14 are adopted, the number of line fragments T per unit area on the display area DA can be reduced. Therefore, a decrease in an aperture ratio of the liquid crystal display panel PNL can be prevented. Furthermore, if such electrode patterns PT with less line fragments T are adopted, the number of line fragments T which may interfere the display area DA. Therefore, moiré can be prevented or reduced better if examples 2 to 5 and 8 to 14 are adopted.

Furthermore, as in examples 3 to 5 and 8 to 14, if electrode patterns PT are formed with various types of unit patterns and bending unit patterns, the electrode patterns PT are intricate and thus, the detection performance of the sensor SE can be maintained good. If the number of line fragments T is reduced, an area in which the common electrode CE and the line fragments T face each other is reduced on the detection surface. If a noncounter area in which the common electrode CE and line fragments T fail to face each other spreads over wide range on the detection surface, a contact of a finger of a user may not be detected therein. If examples 3 to 5 and 8 to 14 are adopted, the electrode patterns PT are intricate and such a noncounter area does not spread over wide range on the detection surface and thus, the detection performance of the sensor SE can be maintained good.

In addition to the above, various advantages can be obtained from the present embodiment.

The structure of the embodiment explained above can be varied arbitrarily. Some variations are presented hereinafter for reference.

(Variation 1)

Figure 31:
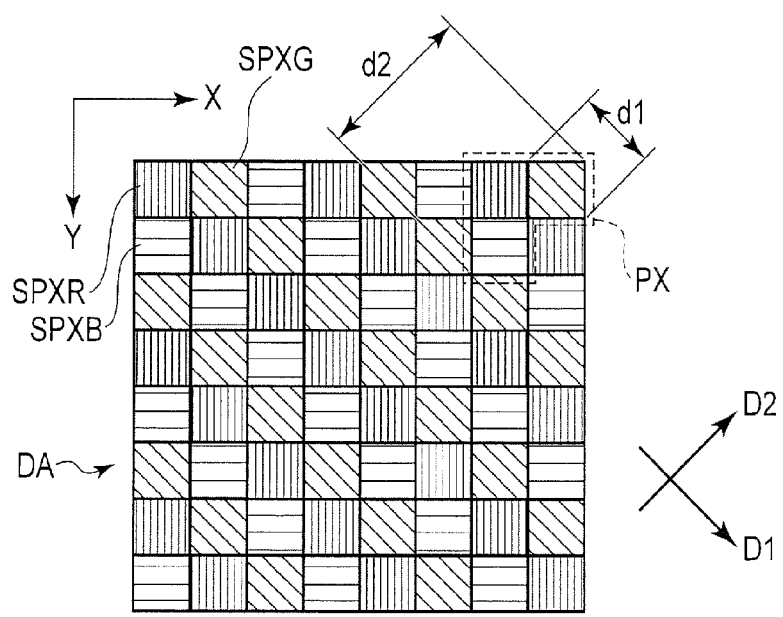
FIG. 31 is a view which illustrates a display area of variation 1.

Pixel arrangement in the display area DA is not limited to those shown in FIGS. 12 and 14. In this variation, another pixel arrangement in the display area DA is explained with reference to FIG. 31. FIG. 31 shows the display area DA in which red subpixels SPXR, green subpixels SPXG, and blue subpixels SPXB are arranged in a matrix extending in directions X and Y. Subpixels SPXR, SPXG, and SPXB are arranged such that the same color subpixels do not continue in either direction X or direction Y. One unit pixel PX is composed of a subpixel SPXR and a subpixel SPXG arranged in direction X and a subpixel SPXB arranged below the subpixel SPXR.

Within this display area DA, the arrangement direction of green subpixels SPXG is used as the first direction D1 (pixel arrangement direction) since green possesses the maximum luminosity for humans amongst red, green, and blue. Therefore, the first direction D1 crosses directions X and Y as in the example depicted. Furthermore, the direction orthogonal to the first direction D1 is defined as second direction D2.

Given that the subpixels SPXR, SPXG, and SPXB are all formed in the same rectangular shape, the unit pixel PX of this variation has its first unit length d1 in the first direction D1 which corresponds to the length of the diagonal line of one subpixel SPX. Furthermore, the unit pixel PX has its second unit length d2 in the second direction D2 which corresponds to twice the length of the diagonal line of one subpixel SPX. Even if the display area DA is varied as above, the same advantage obtained in the above embodiment can be achieved.

(Variation 2)

Figure 32:
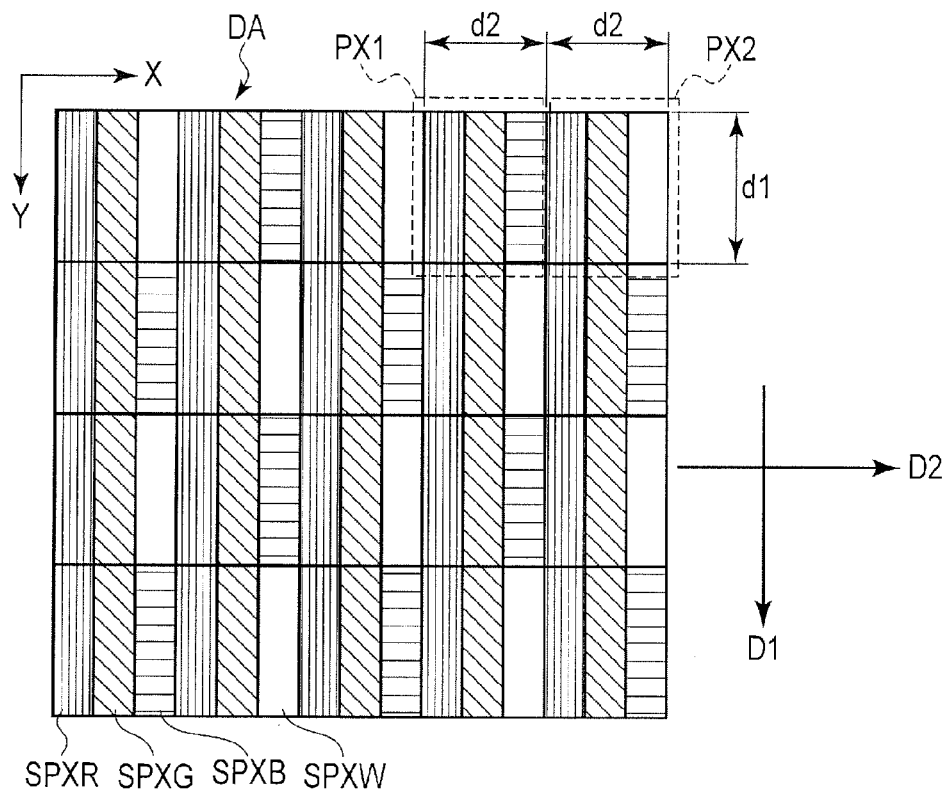
FIG. 32 is a view which illustrates a display area of variation 2.

In this variation, still another pixel arrangement in the display area DA is explained with reference to FIG. 32. FIG. 32 shows the display area DA in which red subpixels SPXR, green subpixels SPXG, blue subpixels SPXB, and white subpixels SPXW are arranged in a matrix extending in directions X and Y. The display area DA includes two kinds of unit pixels PX1 and PX2. Unit pixel PX1 is composed of subpixels SPXR, SPXG, and SPXB arranged in direction X. Unit pixel PX2 is composed of subpixels SPXR, SPXG, and SPXW arranged in direction Y. Unit pixels PX1 and PX2 are arranged alternately in direction X. Furthermore, unit pixels PX1 and PX2 are arranged alternately in direction Y.

Amongst red, green, blue, and white, the color possessing the maximum luminosity for humans is white. Within the display area DA, white subpixels SPXW are not arranged continuously in either direction X or Y. In that case, the first direction D1 (pixel arrangement direction) can be defined based on the average luminosity of a combination of subpixels of different color. For example, in the line of subpixels SPXW and SPXB arranged alternately in direction Y, if the average luminosity of these subpixels SPXW and SPXB is higher than the luminosity of the other subpixels, the first direction D1 can be defined as a direction parallel to direction Y. In that case, the direction orthogonal to the first direction D1, that is, the direction parallel to direction X is defined as second direction D2. In the example depicted, unit pixels PX1 and PX2 have the same first unit length d1 in the first direction D1. Furthermore, unit pixels PX1 and PX2 have the same second unit length d2 in the second direction D2. Even if the display area DA is varied as above, the same advantage obtained in the above embodiment can be achieved.

Variation 2 has been explained given that unit pixel PX2 is with a white subpixel SPXW; however, instead of white subpixel SPXW, unit pixel PX2 may include a subpixel of a different color such as yellow.

(Variation 3)

In the above embodiment, the electrode patterns PT are composed of two types of line fragments Ta and Tb. However, the number of types of the line fragments T can be increased to form the electrode patterns PT.

Figure 33:
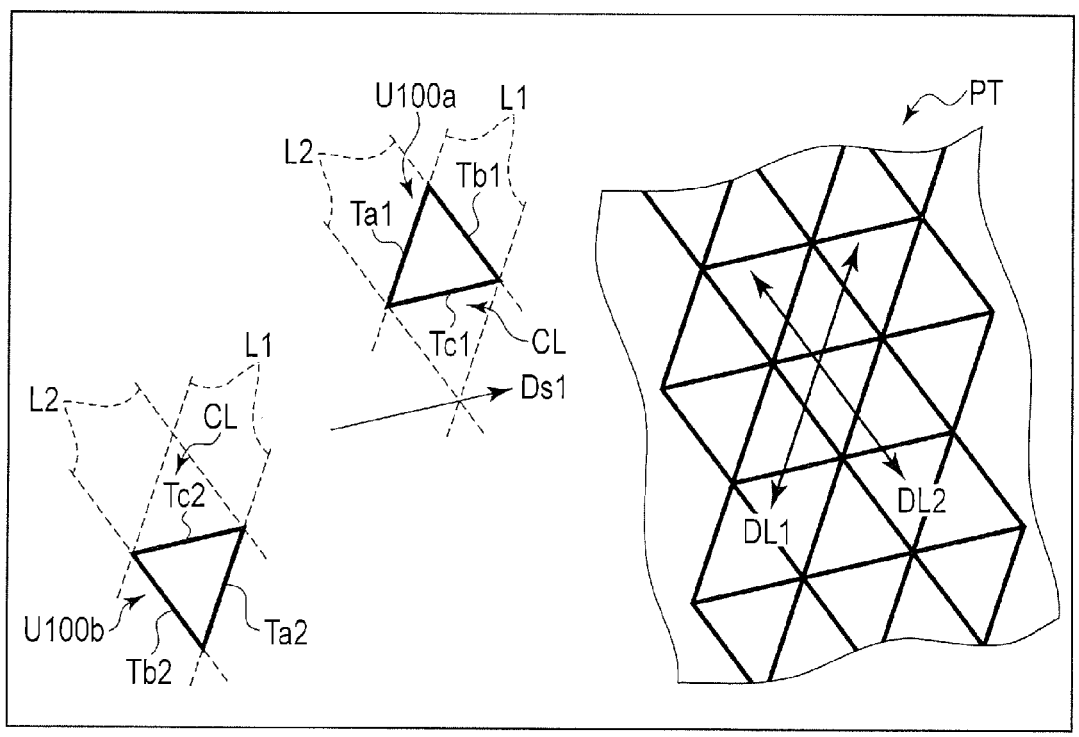
FIG. 33 is a view which schematically shows part of electrode pattern of variation 3.

For example, an electrode pattern PT composed of three types of line fragments T is shown in FIG. 33. This electrode pattern PT is composed of line fragments Ta and Tb, and in addition thereto, line fragments Tc. Each line fragment Tc is disposed between two intersections alongside in the diagonal line direction (arrangement direction Ds1) of four intersections defined by two first lines L1 and two second lines L2.

Unit patterns U100a and U100b are shown in the left of FIG. 33, and the electrode pattern PT of this variation is formed of a combination of unit patterns U110a and U100b. Specifically, the electrode pattern PT is composed of unit patterns U100a and unit patterns U100b arranged alternately along extending directions DL1 and DL2 of the first lines L1 and the second lines L2 of the grid GRD.

The unit pattern U100a is a pattern composed of line fragments Ta1 and Tb1 disposed at adjacent two sides of a cell defined by consecutive two first lines L1 and consecutive two second lines L2 and a line fragment Tc1 disposed to connect the ends of the line fragments Ta1 and Tb1. The unit pattern U100b is a pattern composed of line fragments Ta2 and Tb2 disposed at adjacent two sides of a cell defined by consecutive two first lines L1 and consecutive two second lines L2 and a line fragment Tc2 disposed to connect the ends of the line fragments Ta2 and Tb2. That is, the unit patterns U100a and U100b are closed by the line fragments T. In the example depicted, the first lines L1 and the second lines L2 are crossed each other such that the clockwise angle from a first line L1 to a second line L2 is obtuse (that is, the counterclockwise angle is acute), and pitch P1 and pitch P2 are equal. Therefore, each of the unit patterns U100a and U100b is an isosceles triangle. Or, each of the unit patterns U100a and U100b may be an equilateral triangle.

In this electrode pattern PT, the outlines of two adjacent unit patterns U14a, the outlines of two adjacent unit patterns U14b, and the outlines of adjacent unit patterns U100a and U100b are formed to share one line fragment T. For example, in the two unit patterns U100a and U100b arranged consecutively in extending direction DL1 of the first lines L1, the outlines of these two unit patterns U100a and U100b are formed such that one line fragment Tc disposed at their boundary is used as line fragment Tc1 in the unit pattern U100a and is also used as line fragment Tc2 in the unit pattern U100b.

Even if the electrode pattern PT is prepared using the line fragments Tc extending in arrangement direction Ds1 as in variation 3, moiré caused by the interference between the electrode pattern PT and the display area DA can be prevented or reduced as in the above-described embodiment. That is, given that arrangement direction Ds1 satisfies the condition 2, the extending direction of the line fragments Tc is tilted with respect to the first direction D1 by the angles corresponding to arc tangent (atan) of the ratio between the value obtained by multiplying first unit length d1 by a first integer m (m≥2) and the value obtained by multiplying second unit length d2 by a second integer n (n≥2 and m≠n). Then, the extending direction of the line fragments Tc satisfies the condition 1, too. Thus, moiré caused by the interference between the electrode pattern PT and the display area DA can be prevented or reduced. Note that the same advantage can be obtained even if the line fragments extend in arrangement direction Ds2 in the electrode pattern PT.

Examples 14, 15, 19, 20, and 23 and variation 3 show the electrode patterns PT including two types of unit patterns. However, an electrode pattern PT including three or more unit patterns may be adopted.

Based on the structures which have been described in the above-described embodiment and variations, a person having ordinary skill in the art may achieve structures with arbitral design changes; however, as long as they fall within the scope and spirit of the present invention, such structures are encompassed by the scope of the present invention. For example, the electrode patterns PT only including a part designed based on the technical concept of the above-described embodiment and variations should be acknowledged made within the scope of the invention and actual products with minor differences and design changes caused by their production process should never be acknowledged beyond the scope of the invention.

Furthermore, regarding the present embodiments, any advantage and effect those will be obvious from the description of the specification or arbitrarily conceived by a skilled person are naturally considered achievable by the present invention.

Some examples of a sensor-equipped display device obtained from the embodiments are described below.

[1] A sensor-equipped display device, comprising:
a display panel including a display area in which unit pixels are arranged in a matrix, each of unit pixels including a plurality of subpixels corresponding to different colors; and a detection electrode including conductive line fragments arranged on a detection surface which is parallel to the display area, the detection electrode configured to detect a contact or approach of an object to the detection surface, wherein the detection electrode includes an electrode pattern formed of the line fragments on a grid defined by first lines extending parallel to each other within the detection surface and second lines extending parallel to each other within the detection surface, the first lines and the second lines crossing each other to form intersections, and the line fragments selectively arranged between intersections adjacent to each other in the grid, an extending direction of the first lines, an extending direction of the second lines, and a diagonal line direction of the grid are tilted with respect to a first direction by an angle corresponding to arc tangent of a ratio between a value obtained by multiplying a first unit length of the unit pixel in the first direction by a first integer which is two or more and a value obtained by multiplying second unit length of the unit pixel in a second direction which is orthogonal to the first direction by a second integer which is two or more and different from the first integer, and the first direction is a direction in which, amongst the plurality of subpixels, subpixels having maximum luminosity for humans are aligned on the display area.

[2] The sensor-equipped display device according to the example [1], wherein
the absolute value of the difference between the first integer and the second integer is 1, the first integer and the second integer used to determine a tilt angle from a first direction with respect to at least one of the extending direction of the first lines, the extending direction of the second lines, and the diagonal line direction.

[3] The sensor-equipped display device according to the example [1], wherein
the electrode pattern is a pattern in which the line fragments are selectively arranged between intersections adjacent to each other in the first lines and intersections adjacent to each other in the second lines in the grid.

[4] The sensor-equipped display device according to example [1], wherein
the electrode pattern is a pattern in which the line fragments are selectively arranged between intersections adjacent to each other in the first lines, intersections adjacent to each other in the second lines, and intersections adjacent to each other in the diagonal line direction in the grid.

[5] The sensor-equipped display device according to example [1], wherein
the electrode pattern includes unit patterns of which outlines are closed by the line fragments, and
the outlines of the unit patterns adjacent to each other share at least one of the line fragments.

[6] The sensor-equipped display device according to example [1], wherein
the electrode pattern includes a plurality of types of unit patterns of which outlines are closed by the line fragments, and
the outlines of the plurality of types of unit patterns are different in shape.

[7] The sensor-equipped display device according to example [1], wherein
the electrode pattern is a pattern in which the line fragments are arranged alternately in the diagonal line direction such that the line fragments arranged between intersections adjacent to each other in the first lines and the line fragments arranged between intersections adjacent to each other in the second lines are connected at ends thereof.

[8] The sensor-equipped display device according to the example [1], further comprising:
a driving electrode configured to form a capacitance between the detection electrode and thereof; and
a detection circuit configured to detect a contact or approach of an object to the detection surface based on a change in the capacitance, wherein
the line fragment includes a metal material, and
the driving electrode includes a transmissive material and is disposed in a layer different from the detection electrode in a normal direction of the display area to be opposed to the detection electrode with a dielectric intervening therebetween.

[9] The sensor equipped display device according to the example [1], wherein the display panel comprises a common electrode forming a capacitance between the detection electrode and thereof, and a pixel electrode provided with each sub pixel to be opposed to the common electrode with an insulating film intervening therebetween, and
the display device further comprises a detection circuit configured to detect a contact and approach of an object to the detection surface based on a change in the capacitance, and a driving circuit configured to supply a first driving signal for driving the subpixels and a second driving signal for forming the capacitance used by the detection circuit to detect a contact or approach of an object to the detection surface, selectively, to the common electrode.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A sensor device, comprising:
a plurality of unit pixels arranged in a matrix, each of the unit pixels including a plurality of subpixels corresponding to at least a first color and a second color; and
a detection electrode including conductive line fragments arranged on a detection surface, wherein
the detection electrode includes an electrode pattern formed of the line fragments on a grid defined by first lines extending parallel to each other within the detection surface and second lines extending parallel to each other within the detection surface, the first lines and the second lines crossing each other to form intersections, and the line fragments selectively arranged between intersections adjacent to each other in the grid,
a first extending direction of the first lines is tilted with respect to a first direction by an angle $\theta1$, a second extending direction of the second lines is tilted with respect to the first direction by an angle $\theta2$, a first diagonal line direction of the grid is tilted with respect to the first direction by an angle $\varphi1$, and a second diagonal line direction of the grid is tilted with respect the first direction by an angle $\varphi2$,
the first direction is a direction in which, amongst the plurality of subpixels, subpixels corresponding to the first color are aligned,
each unit pixel has a first unit length d1 in the first direction, and has a second unit length d2 in a second direction perpendicular to the first direction,
the angles $\theta1$ and $\theta2$ are different from each other, and satisfy following equations using integers M1, N1, M2 and N2 greater than or equal to two, where M1≠N1, M2≠N2, and M1:N1≠M2:N2,
$\theta1$=atan [(N1×d2)/(M1×d1)]
$\theta2$=atan [(N2×d2)/(M2×d1)], and
the angles $\varphi1$ and $\varphi2$ are different from each other, and satisfy following equations using m1, n1, m2 and n2 greater than or equal to two, where m1≠n1, m2≠n2, and m1:n1≠m2:n2,
$\varphi1$=atan [(n1×d2)≠(m1×d1)]
$\varphi2$=atan [(n2×d2)≠(m2×d1)].

2. The sensor device according to claim 1, wherein the absolute value of the difference between the integer M1 and the integer N1, the absolute value of the difference between the integer M2 and the integer N2, the absolute value of the difference between the integer m1 and the integer n1, and the absolute value of the difference between the integer m2 and the integer n2 are 1.

3. The sensor device according to claim 1, wherein the electrode pattern is a pattern in which the line fragments are selectively arranged between intersections adjacent to each other in the first lines and intersections adjacent to each other in the second lines in the grid.

4. The sensor device according to claim 1, wherein the electrode pattern is a pattern in which the line fragments are selectively arranged between intersections adjacent to each other in the first lines, intersections adjacent to each other in the second lines, and intersections adjacent to each other in the diagonal line direction in the grid.

5. The sensor device according to claim 1, wherein the electrode pattern includes unit patterns of which outlines are closed by the line fragments, and the outlines of the unit patterns adjacent to each other share at least one of the line fragments.

6. The sensor device according to claim 1, wherein the electrode pattern includes a plurality of types of unit patterns of which outlines are closed by the line fragments, and the outlines of the plurality of types of unit patterns are different in shape.

7. The sensor device according to claim 1, wherein the electrode pattern is a pattern in which the line fragments are arranged alternately in the diagonal line direction such that the line fragments arranged between intersections adjacent to each other in the first lines and the line fragments arranged between intersections adjacent to each other in the second lines are connected at ends thereof.

8. The sensor device according to claim 1, further comprising:
a driving electrode configured to form a capacitance between the detection electrode and thereof; and
a detection circuit configured to detect a contact or approach of an object to the detection surface based on a change in the capacitance, wherein the line fragment includes a metal material, and the driving electrode includes a transmissive material and is disposed in a layer different from the detection electrode in a normal direction of the detection surface to be opposed to the detection electrode with a dielectric intervening therebetween.

* * * * *